United States Patent
Kubota et al.

(10) Patent No.: US 11,032,783 B2
(45) Date of Patent: Jun. 8, 2021

(54) PER FREQUENCY INDICATION OF DEPLOYMENT SCHEMES

(71) Applicant: QUALCOMM Incorporated, San Diego, CA (US)

(72) Inventors: Keiichi Kubota, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/058,330

(22) Filed: Aug. 8, 2018

(65) Prior Publication Data

US 2019/0053175 A1    Feb. 14, 2019

Related U.S. Application Data

(60) Provisional application No. 62/544,769, filed on Aug. 11, 2017.

(51) Int. Cl.
*H04W 56/00*    (2009.01)
*H04W 48/16*    (2009.01)
(Continued)

(52) U.S. Cl.
CPC ......... *H04W 56/001* (2013.01); *H04W 16/14* (2013.01); *H04W 24/10* (2013.01);
(Continued)

(58) Field of Classification Search
None
See application file for complete search history.

(56) References Cited

U.S. PATENT DOCUMENTS

| 2006/0166694 A1* | 7/2006 | Jeong | H04W 48/16 455/525 |
| 2007/0230420 A1* | 10/2007 | Bumiller | H04W 48/18 370/338 |

(Continued)

FOREIGN PATENT DOCUMENTS

| EP | 3091808 A1 | 11/2016 | |
| WO | WO-2013046123 A1 * | 4/2013 | ............ H04W 48/16 |

OTHER PUBLICATIONS

International Search Report and Written Opinion—PCT/US2018/046128—ISA/EPO—dated Dec. 4, 2018.

(Continued)

*Primary Examiner* — Kouroush Mohebbi
(74) *Attorney, Agent, or Firm* — Holland & Hart LLP

(57) ABSTRACT

Methods, systems, and devices for wireless communication are described. A per-frequency indication providing deployment options for communication with a core network may be used for enhanced cell selection by a user equipment (UE). For example, system information transmitted by a base station may provide information elements that indicate, per radio frequency (or per radio frequency (RF) spectrum band)), deployment options associated with nearby cells. In such cases, the UE may determine whether to access the radio frequencies or RF bands of these cells based on the capabilities of the UE. In some cases, the UE may further determine whether the nearby cells are available based on the availability of a service through those cells. Accordingly, the UE may select one of the radio frequencies or bands corresponding to the cell having a network connectivity configuration that supports the UE's capabilities.

30 Claims, 22 Drawing Sheets

(51) Int. Cl.
*H04W 76/15* (2018.01)
*H04W 16/14* (2009.01)
*H04W 24/10* (2009.01)
*H04W 48/20* (2009.01)

(52) U.S. Cl.
CPC .......... *H04W 48/16* (2013.01); *H04W 76/15* (2018.02); *H04W 48/20* (2013.01)

(56) References Cited

U.S. PATENT DOCUMENTS

2016/0234759 A1   8/2016  Kubota et al.
2017/0135005 A1*  5/2017  Basu Mallick ....... H04W 36/04

OTHER PUBLICATIONS

OPPO: "Discussion on Issues of Other Sis", 3GPP Draft; R2-167480—Discussioneoneissueseaboutenresystemeinformationedesign-V1, 3rd Generation Partnership Project (3GPP), Mobile Competence Centre; 650, Route Des Lucioles; F-06921 Sophia-Antipolis, vol. RAN WG2, No. Reno, USA; Nov. 14, 2016-Nov. 18, 2016, Nov. 13, 2016 (Nov. 13, 2016), pp. 1-4, XP051177396, Retrieved from the Internet: URL: http://www.3gpp.org/ftp/Meetings_3GPP_sync/ran2/Docs/ [retrieved on Nov. 13, 2016].

* cited by examiner

PER FREQUENCY INDICATION OF DEPLOYMENT SCHEMES

CROSS REFERENCES

The present Application for Patent claims benefit of U.S. Provisional Patent Application No. 62/544,769 by Kubota et al., entitled "Per Frequency Indication of Deployment," filed Aug. 11, 2017, assigned to the assignee hereof, and expressly incorporated by reference in its entirety.

BACKGROUND

The following relates generally to wireless communication, and more specifically to a per frequency indication of deployment schemes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency-division multiplexing (DFT-S-OFDM). A wireless multiple-access communications system may include a number of base stations or network access nodes, each simultaneously supporting communication for multiple communication devices, which may be otherwise known as user equipment (UE).

A UE may support access to multiple types of wireless systems that use different deployment configurations for wireless communications. For example, the UE may be configured for communications with systems associated with different radio access technologies (RATs), for stand-alone or non-standalone (e.g., dual connectivity) deployment schemes, or various combinations thereof. It may be beneficial for a UE to switch its access to one or more different cells to fully support the UE's capabilities or to obtain access to different services used by the UE.

SUMMARY

The described techniques relate to improved methods, systems, devices, or apparatuses that support a per frequency indication of deployment schemes. Generally, the described techniques provide for indicating deployment options to a user equipment (UE) for communication with a core network. For example, system information transmitted by a base station may provide information elements that indicate, per radio frequency (or per radio frequency (RF) spectrum band)), deployment options associated with nearby cells. In such cases, the UE may determine whether to access the radio frequencies or RF bands of these cells based on the capabilities of the UE. In some cases, the UE may further determine whether the nearby cells are available based on the availability of a service through those cells. Accordingly, the UE may select one of the radio frequencies or RF spectrum bands corresponding to the cell having a network connectivity configuration that supports the UE's capabilities or the desired services.

A method of wireless communication is described. The method may include receiving, from a first cell, system information comprising an information element indicating one or more radio frequencies or radio frequency (RF) spectrum bands available for use at a second cell and one or more network connectivity configurations, each of the one or more radio frequencies or RF spectrum bands associated with at least one of the one or more network connectivity configurations, identifying a capability of the UE to support the one or more network connectivity configurations indicated by the information element, and selecting the first cell, or the second cell, or a combination thereof, to communicate with the core network based at least in part on the received information element and the identified capability, or providing, to an upper layer of the UE, an indication of an availability of the first cell, or the second cell, or a combination thereof, based at least in part on the received information element and the identified capability.

An apparatus for wireless communication is described. The apparatus may include means for receiving, from a first cell, system information comprising an information element indicating one or more radio frequencies or RF spectrum bands available for use at a second cell and one or more network connectivity configurations, each of the one or more radio frequencies or RF spectrum bands associated with at least one of the one or more network connectivity configurations, means for identifying a capability of the UE to support the one or more network connectivity configurations indicated by the information element, and means for selecting the first cell, or the second cell, or a combination thereof, to communicate with the core network based at least in part on the received information element and the identified capability, or providing, to an upper layer of the UE, an indication of an availability of the first cell, or the second cell, or a combination thereof, based at least in part on the received information element and the identified capability.

Another apparatus for wireless communication is described. The apparatus may include a processor, memory in electronic communication with the processor, and instructions stored in the memory. The instructions may be operable to cause the processor to receive, from a first cell, system information comprising an information element indicating one or more radio frequencies or RF spectrum bands available for use at a second cell and one or more network connectivity configurations, each of the one or more radio frequencies or RF spectrum bands associated with at least one of the one or more network connectivity configurations, identify a capability of the UE to support the one or more network connectivity configurations indicated by the information element, and select the first cell, or the second cell, or a combination thereof, to communicate with the core network based at least in part on the received information element and the identified capability, or providing, to an upper layer of the UE, an indication of an availability of the first cell, or the second cell, or a combination thereof, based at least in part on the received information element and the identified capability.

A non-transitory computer readable medium for wireless communication is described. The non-transitory computer-readable medium may include instructions operable to cause a processor to receive, from a first cell, system information comprising an information element indicating one or more radio frequencies or RF spectrum bands available for use at a second cell and one or more network connectivity configurations, each of the one or more radio frequencies or RF spectrum bands associated with at least one of the one or more network connectivity configurations, identify a capability of the UE to support the one or more network connectivity configurations indicated by the information element, and select the first cell, or the second cell, or a combination thereof, to communicate with the core network based at least in part on the received information element and the identified capability, or providing, to an upper layer of the UE, an indication of an availability of the first cell, or the second cell, or a combination thereof, based at least in part on the received information element and the identified capability.

Some examples of the method, apparatus, and non-transitory computer-readable medium described above may further include processes, features, means, or instructions for identifying a service to use at the UE. Some examples of the method, apparatus, and non-transitory computer-readable medium described above may further include processes, features, means, or instructions for determining whether the identified service may be available through the second cell based at least in part on the received information element, wherein the first cell may be selected based at least in part on the identification of the capability of the UE to support the one or more network connectivity configurations indicated by the information element.

Some examples of the method, apparatus, and non-transitory computer-readable medium described above may further include processes, features, means, or instructions for determining that the identified service may be available through the second cell, wherein selecting the first cell comprises camping on the first cell, or the second cell, or a combination thereof based at least in part on the availability of the service.

Some examples of the method, apparatus, and non-transitory computer-readable medium described above may further include processes, features, means, or instructions for determining that the identified service may be unavailable through the second cell, wherein selecting the first cell comprises camping on the first cell based at least in part on the unavailability of the identified service.

Some examples of the method, apparatus, and non-transitory computer-readable medium described above may further include processes, features, means, or instructions for receiving one or more synchronization signals from the second cell. Some examples of the method, apparatus, and non-transitory computer-readable medium described above may further include processes, features, means, or instructions for performing a measurement of the received one or more synchronization signals, wherein selecting the first cell may be based at least in part on the measurement.

Some examples of the method, apparatus, and non-transitory computer-readable medium described above may further include processes, features, means, or instructions for determining that the measurement of the received one or more synchronization signals satisfies predetermined one or more criteria, wherein selecting the first cell comprises camping on the first cell, or the second cell, or a combination thereof.

Some examples of the method, apparatus, and non-transitory computer-readable medium described above may further include processes, features, means, or instructions for determining that the measurement of the received one or more synchronization signals fails to satisfy predetermined one or more criteria, wherein the selecting comprises camping on the first cell. In some examples of the method, apparatus, and non-transitory computer-readable medium described above, the synchronization signal comprises a primary synchronization signal (PSS), or a secondary synchronization signal (SSS), or a combination thereof.

In some examples of the method, apparatus, and non-transitory computer-readable medium described above, the selecting comprises: reselecting the first cell or the second cell based at least in part on the received information element and the identified capability. Some examples of the method, apparatus, and non-transitory computer-readable medium described above may further include processes, features, means, or instructions for receiving, as part of the system information, a second information element that may be associated with the radio frequencies or the RF spectrum bands in use by a third cell, wherein the second information element indicates a second network connectivity configuration for access to the core network via the third cell, the second network connectivity configuration being different from a first network connectivity configuration supported by the UE. Some examples of the method, apparatus, and non-transitory computer-readable medium described above may further include processes, features, means, or instructions for selecting the second cell or the third cell based at least in part on the identified capability.

Some examples of the method, apparatus, and non-transitory computer-readable medium described above may further include processes, features, means, or instructions for transmitting an indication of the identified capability to the first cell. In some examples of the method, apparatus, and non-transitory computer-readable medium described above, the system information comprises a system information block (SIB) that includes a list of one or more radio frequencies, or one or more RF spectrum bands available at a plurality of neighboring cells.

In some examples of the method, apparatus, and non-transitory computer-readable medium described above, the one or more network connectivity configurations comprise a standalone deployment of the second cell, or a dual connectivity deployment of the first cell and the second cell, or a combination thereof. In some examples of the method, apparatus, and non-transitory computer-readable medium described above, the one or more network connectivity configurations comprise core network that operates using a different radio access technology (RAT) than the RAT of the first cell, or the second cell, or both the first cell and the second cell. In some examples of the method, apparatus, and non-transitory computer-readable medium described above, the first RAT comprises an evolved universal terrestrial radio access (E-UTRA) RAT and the second RAT comprises new radio (NR) RAT.

A method of wireless communication is described. The method may include receiving, at a first cell provided by the base station, a message comprising cell information for the first cell, the cell information including an indication of a network connectivity configuration in use by a second cell to access to a core network, determining that a UE in communication with the first cell supports the indicated network connectivity configuration in use by the second cell, and transmitting, to the UE, system information comprising an information element indicating one or more radio frequencies or RF spectrum bands available for use at the second cell and one or more network connectivity configurations, each of the one or more radio frequencies or RF spectrum bands associated with at least one of the one or more network connectivity configurations of the second cell.

An apparatus for wireless communication is described. The apparatus may include means for receiving, at a first cell provided by the base station, a message comprising cell information for the first cell, the cell information including an indication of a network connectivity configuration in use by a second cell to access to a core network, means for determining that a UE in communication with the first cell supports the indicated network connectivity configuration in use by the second cell, and means for transmitting, to the UE, system information comprising an information element indicating one or more radio frequencies or RF spectrum bands available for use at the second cell and one or more network connectivity configurations, each of the one or more radio frequencies or RF spectrum bands associated with at least one of the one or more network connectivity configurations of the second cell.

Another apparatus for wireless communication is described. The apparatus may include a processor, memory in electronic communication with the processor, and instructions stored in the memory. The instructions may be operable to cause the processor to receive, at a first cell provided by the base station, a message comprising cell information for the first cell, the cell information including an indication of a network connectivity configuration in use by a second cell to access to a core network, determine that a UE in communication with the first cell supports the indicated network connectivity configuration in use by the second cell, and transmit, to the UE, system information comprising an information element indicating one or more radio frequencies or RF spectrum bands available for use at the second cell and one or more network connectivity configurations, each of the one or more radio frequencies or RF spectrum bands associated with at least one of the one or more network connectivity configurations of the second cell.

A non-transitory computer readable medium for wireless communication is described. The non-transitory computer-readable medium may include instructions operable to cause a processor to receive, at a first cell provided by the base station, a message comprising cell information for the first cell, the cell information including an indication of a network connectivity configuration in use by a second cell to access to a core network, determine that a UE in communication with the first cell supports the indicated network connectivity configuration in use by the second cell, and transmit, to the UE, system information comprising an information element indicating one or more radio frequencies or RF spectrum bands available for use at the second cell and one or more network connectivity configurations, each of the one or more radio frequencies or RF spectrum bands associated with at least one of the one or more network connectivity configurations of the second cell.

Some examples of the method, apparatus, and non-transitory computer-readable medium described above may further include processes, features, means, or instructions for transmitting, as part of the system information, a second information element for an RF spectrum band in use by a second cell, wherein the second information element indicates a second network connectivity configuration for access to the core network via the second cell, the second network connectivity configuration being different from a first network connectivity configuration supported by the UE.

Some examples of the method, apparatus, and non-transitory computer-readable medium described above may further include processes, features, means, or instructions for selecting the network connectivity configuration or the second network connectivity configuration for the UE to use, wherein the selecting may be based at least in part on the indicated capability. Some examples of the method, apparatus, and non-transitory computer-readable medium described above may further include processes, features, means, or instructions for receiving the message from a network node, or from the second cell, or a combination thereof.

Some examples of the method, apparatus, and non-transitory computer-readable medium described above may further include processes, features, means, or instructions for determining a service provided by the second cell. Some examples of the method, apparatus, and non-transitory computer-readable medium described above may further include processes, features, means, or instructions for indicating, in the system information, the determined service provided by the second cell.

Some examples of the method, apparatus, and non-transitory computer-readable medium described above may further include processes, features, means, or instructions for receiving, from the UE, an indication of a capability of the UE to support the network connectivity configuration, wherein the determining may be based on the received indication of the capability.

In some examples of the method, apparatus, and non-transitory computer-readable medium described above, the network connectivity configuration comprises a standalone deployment of the second cell, or an assisted access deployment of the first cell and the second cell. In some examples of the method, apparatus, and non-transitory computer-readable medium described above, the core network comprises a first core network that operates using a RAT or a second core network that operates using a second RAT that may be different from the first RAT.

In some examples of the method, apparatus, and non-transitory computer-readable medium described above, the first RAT comprises an E-UTRA RAT and the second RAT comprises NR RAT. In some examples of the method, apparatus, and non-transitory computer-readable medium described above, the system information comprises an SIB including a list of at least one cell, the at least one cell including the second cell.

DETAILED DESCRIPTION

Figure 1:
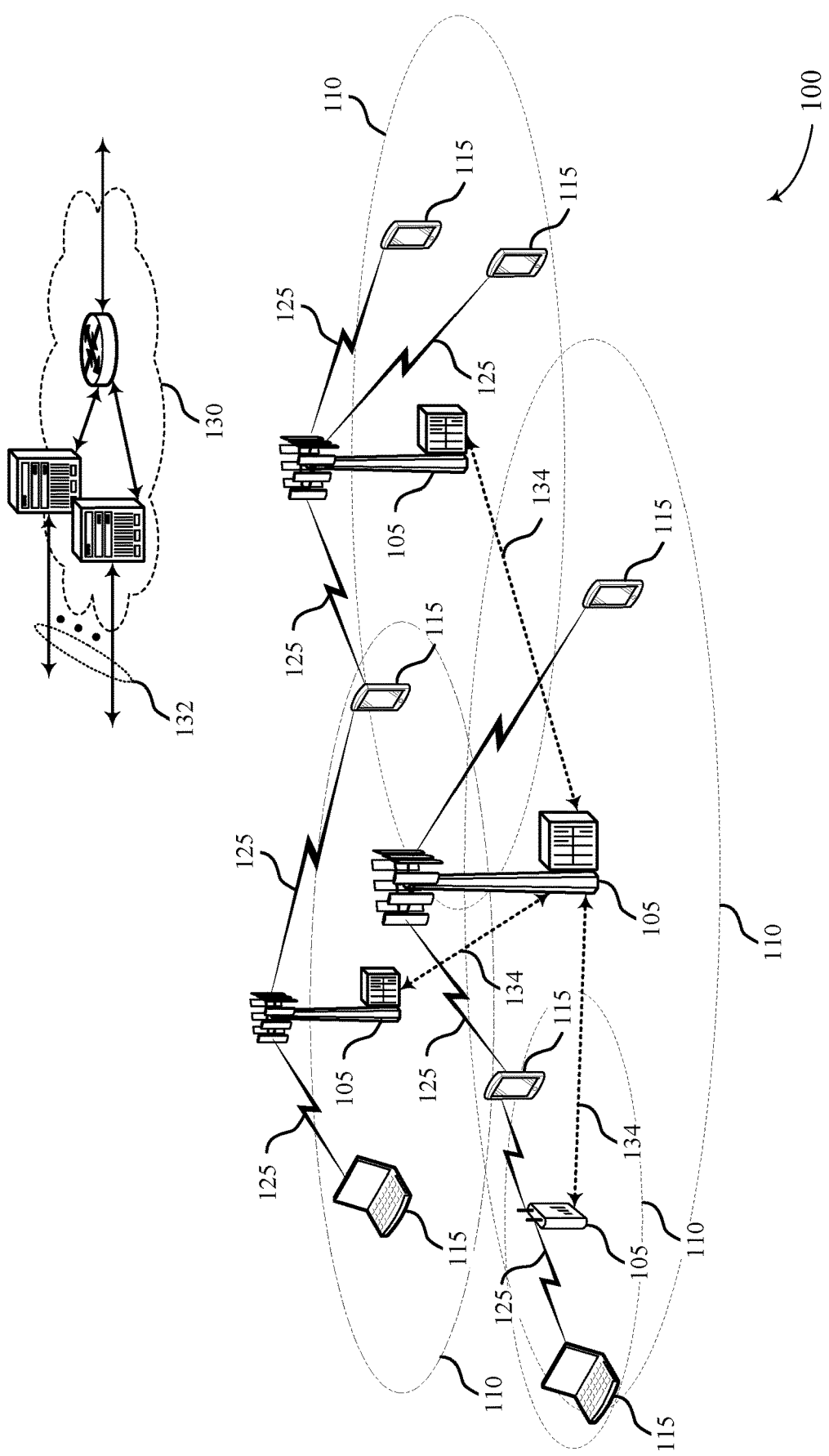
FIG. 1 illustrates an example of a wireless communications system that supports a per frequency indication of deployment schemes in accordance with aspects of the present disclosure.

A user equipment (UE) may be capable of using multiple radio access technologies (RATs), and different cells providing access to these RATs may support different types of deployments for wireless communications with a core network (e.g., an evolved packet core (EPC), a next generation core (NGC), a fifth generation core (5GC) and the like). For example, the UE may be served by a base station for LTE communications, but the UE may also be capable of NR communications, and a cell may provide access to one or both of the EPC and 5GC. Additionally, the UE may be capable of communication using various configurations of a currently accessed RAT (e.g., dual connectivity schemes, operating at various frequencies, etc.).

A base station may determine available network connectivity configurations for the UE based on available network configurations of neighboring cells. For example, a core network may indicate to a base station communicating with the UE which network configurations are supported by a neighboring cell (e.g., served by neighboring base stations). In some examples, the UE may also transmit its capabilities to the base station. As a result, the base station may determine whether the UE is capable of supporting the network configurations of its own cell and/or neighboring cells based on the capabilities of the UE and the indication from the core network.

The base station may transmit system information related to its own cell and neighboring cells to the UE. For example, the base station may transmit system information including one or more information elements. Information elements may indicate one or more available radio frequencies or radio frequency (RF) spectrum bands and a wireless configuration supported on each of the radio frequencies or RF spectrum bands. In some examples, an information element included in a system information transmission may include a list of available radio frequencies or RF spectrum bands in the area (e.g., the geographic location where the UE is located). The UE may thus search for a nearby cell supporting a specific RAT or network configuration based on the list of radio frequencies or RF spectrum bands.

In some examples, the information element may indicate that a radio frequency or RF spectrum band does not correspond to a cell that the UE can camp on. For instance, an information element per neighbor frequency may indicate that the frequency does not have any cell that UE can camp on. In such cases, the information element may be a non-campable frequency information element. If such an information element is present, then the UE may not select (or refrain from selecting) the corresponding radio frequency or RF spectrum band as a candidate for cell selection or reselection. As an example, the UE may receive, via an information element, an indication that a cell or frequency is associated with a non-standalone or dual connectivity deployment type (e.g., evolved universal terrestrial radio access (E-UTRA) new radio (NR)-dual connectivity (EN-DC) or other types of multi-radio access technology-dual connectivity (MR-DC)), and the UE may refrain from camping on the indicated cell or frequency. As a result, the UE may camp on another cell or frequency having a different deployment type, such as a standalone deployment type.

If the UE finds a cell which supports a specific RAT or network configuration, the UE may measure signal quality, or signal strength, or both, of a reference signal, or a synchronization signal, or both, from the cell. The UE may compare the measurements of the reference signal to a threshold and determine whether the specific RAT or network connectivity configuration of the neighboring cell is available. A determination of availability may be made when the cell quality or signal strength parameters satisfies the threshold or combination of thresholds for more than one parameter. If the signal quality or signal strength satisfies the threshold, the UE may camp on the selected cell. In other examples, if the signal quality does not satisfy the threshold, the UE may remain camped on a cell, or camp on a serving cell.

The UE may select a cell from the list of available radio frequencies or RF spectrum bands based on the network configuration of the cell and the UE's capabilities. In some examples, the UE may select a currently-camped cell, a serving cell, a neighboring cell, or a combination thereof, and return to a radio frequency or RF spectrum band corresponding to the selected cell. The UE may then camp on the selected cell to communicate using a corresponding network configuration. In some examples, the UE may be able to use multiple network configurations indicated in the system information transmission. For example, the UE may be able to use a first network configuration on a cell, a second network configuration on a second cell, and the first network configuration or a third network configuration on a third cell. The serving cell may indicate which of the multiple network configurations for the UE to use. The UE may then communicate with the core network according to the indicated network configuration or network connectivity configuration. In some examples, the UE may indicate which RATs or RAT configurations are available to the user (e.g., by a display of the UE visible to a user).

Aspects of the disclosure are initially described in the context of a wireless communications system. Example network connectivity configurations are illustrated and techniques for implementing the network connectivity configurations are described. Aspects of the disclosure are further illustrated by and described with reference to apparatus diagrams, system diagrams, and flowcharts that relate to per frequency indication of deployment schemes.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE network, an LTE-Advanced (LTE-A) network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and wireless communications system 100 may be configured to provide ultra-reliable communications for these functions.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an EPC, which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300

MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 25 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band, such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. Some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction that is determined based on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs). In some cases, an sTTI may have a different numerology (e.g., waveform numerology) than other TTIs, such as a different subcarrier spacing than a 1 ms TTI. As an example, a subcarrier spacing of a TTI may be based on various propagation characteristics, such as delay spread and Doppler spread, and may also change with cell size. Accordingly, different TTIs may utilize different waveform numerologies to account for such characteristics.

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-s-OFDM). In some cases, a carrier may also be referred to as a radio frequency, an RF band, an RF spectrum band, or other like terminology.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems, such as an NR system, may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may support indications of different deployment schemes (e.g., network connectivity configurations) for wireless devices (e.g., UEs 115). For example, a UE 115 may receive a list of radio frequencies or RF spectrum bands for nearby cells within information elements sent by a base station 105. The UE 115 may further identify network connectivity configurations available on the nearby cells, for example, based on a capability of the UE 115 to support the network connectivity configuration of an identified cell. The UE 115 may camp on one of the nearby cells based on the capability of the UE or based on an availability of services provided by the nearby cells, or both. The UE 115 may, in some cases, camp on one of the nearby cells based on signal strength or signal quality of the cell. In any case, the UE 115 may indicate to the user (e.g., by a higher layer, such as an application layer) which services or network connectivity configurations are available on the camped cell.

Figure 2:
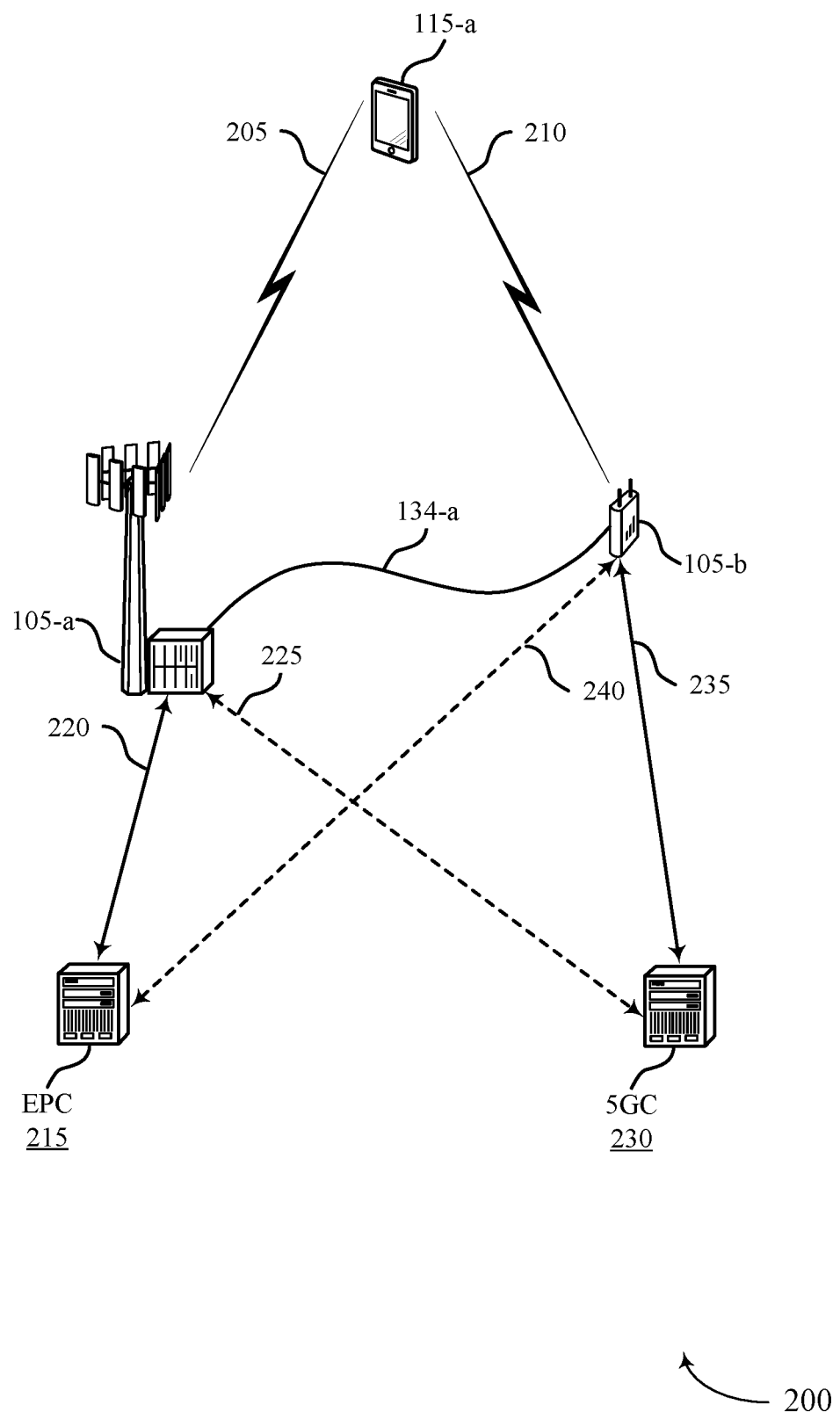
FIGS. 2 through 7 illustrate examples of wireless communications systems that supports a per frequency indication of deployment schemes in accordance with aspects of the present disclosure.

FIG. 2 illustrates an example of a wireless communications system 200 that supports a per frequency indication of deployment schemes in accordance with various aspects of the present disclosure. In some examples, wireless communications system 200 may implement aspects of wireless communications system 100. Wireless communications system 200 includes UE 115-*a*, which may be an example of a UE 115 as described with reference to FIG. 1. Wireless communications system 200 also includes base station 105-*a* and base station 105-*b*, which may each be an example of a base station 105 as described with reference to FIG. 1. It is understood that references to specific RATs (e.g., LTE and NR) in the figures are provided for illustrative purposes only, and different RATs not specifically referred to herein may be used interchangeably with those described below.

Base station 105-*a* may be an example of an eNB (e.g., configured for LTE communications) and base station 105-*b* may be an example of a gNB (e.g., configured for NR communications). Base station 105-*a* and base station 105-*b* may communicate using backhaul links 134-*a*, which may be an example of backhaul links 134 (e.g., X2 or other interface) as described with reference to FIG. 1. Base station 105-*a* may communicate with EPC 215 using communication link 220. For example, EPC 215 may send base station 105-*a* messages (e.g., including network information) using communication link 220. Similarly, base station 105-*b* may communicate with a 5GC 230 using communication link 235. In some cases, 5GC 230 may include a user plane function (UPF), an access and mobility function (AMF), a session management function (SMF), or a control plane function (CPF), or a combination thereof. In some examples, the UPF may handle user information such as PDCP, RLC, MAC, and PHY communications. In some examples, the AMF may handle control information, such as RRC. Additionally, the UPF and AMF may be communicatively coupled in the 5GC 230. In some implementations, base station 105-*a* and base station 105-*b* may each be configured for both LTE and NR communications. As such, base station 105-*a* may communicate with 5GC 230 via communication link 225, and base station 105-*b* may communicate with EPC 215 via communication link 240.

UE 115-*a* may communicate with one or both of base station 105-*a* and base station 105-*b* using communication link 205 and 210, respectively. In one example, UE 115-*a* may be capable of utilizing multiple RATs for wireless communications with a core network (e.g., EPC 215 or 5GC 230). UE 115-*a* may be served by an E-UTRAN cell of base station 105-*a* for LTE communications, but UE 115-*a* may also be capable of NR communications by communicating with another cell (e.g., provided by base station 105-*b*). In some examples, base station 105-*a* may be a serving cell of UE 115-*a*. In other examples, UE 115-*a* may consider camping on the cell of base station 105-*a* or consider camping on a cell of base station 105-*b*. Additionally or alternatively, UE 115-*a* may be capable of communication using various configurations of a currently-used RAT (e.g., dual connectivity schemes, operating at various frequencies, etc.). Accordingly, UE 115-*a* may perform the techniques described herein for channel selection or channel reselection for various cells.

Base station 105-*a* may determine an available network connectivity configuration for UE 115-*a* based on available network configurations of neighboring cells. A network connectivity configuration may include a number of deployment options or scenarios, deployment modes, RAT technologies or RAT configurations, among other configurations of a connection between UE 115-*a* and the core network. In some examples, each neighboring cell may correspond to another base station 105. In some examples, the core network may indicate (e.g., via a node of the core network such as the EPC 215 or the 5GC 230) to base station 105-*a* which network configurations are supported by base station 105-*b*. In some examples, UE 115-*a* may transmit an indication of its own capabilities using the serving cell (e.g., base station 105-*a*) to the EPC 215. In such cases, base station 105-*a* may determine that UE 115-*a* is capable of supporting one or more of the network configurations of base station 105-*b*, for example, based on the capabilities of UE 115-*a* or the indication from the core network, or both.

Base station 105-*a* may transmit system information related to the neighboring cells (e.g., base station 105-*b*) to UE 115-*a* over communication link 205. In some examples, the system information may include one or more information elements. In some examples, an information element may indicate an RF spectrum band of a nearby cell and a wireless configuration supported by the nearby cell. In some examples, the information element of the system information may include a list of available carriers (e.g., radio frequencies or RF spectrum bands) corresponding to nearby cells in the area. In other examples, the information element may indicate one or more radio frequencies (e.g., in one or more RF spectrum bands) and available network connectivity configurations for the one or more radio frequencies. In some examples, the system information may not include information elements for frequencies, RF spectrum bands, or network connectivity configurations that are unusable by UE 115-*a*, which may be determined based on the capabilities of UE 115-*a* or availability of the network connectivity configurations. In some examples, if a service (e.g., NR communications, types of data services, or services associated with a specific application or operator, among others) is unavailable from the serving cell or neighboring cells, UE 115-*a* may stay on (e.g., camp) the current serving cell, or the cell from which the system information transmission is received.

Additionally or alternatively, UE 115-*a* may identify a set of radio frequencies or RF spectrum bands and search for a neighboring cell supporting a specific RAT or network configuration based on the radio frequencies. If UE 115-*a* finds a neighboring cell which supports the specific RAT or network configuration, UE 115-*a* may measure signal quality or signal strength of a reference signal (e.g., a reference signal received power (RSRP) or a reference signal received quality (RSRQ)) or a synchronization signal (e.g., an NR synchronization signal, an SSS, a PSS, a synchronization signal block, a synchronization signal burst, or the like) transmitted by the neighboring cell. UE 115-*a* may compare the cell quality or signal strength to a threshold or predetermined criteria, and UE 115-*a* may determine whether the specific RAT or network connectivity configuration of the neighboring cell is available. For example, if the signal strength does not satisfy the threshold of one or more criteria, then UE 115-*a* may determine that the cell is not available. Alternatively, a determination of availability may be made when the cell quality or signal strength satisfies the threshold or criteria. In some examples, the threshold may be configurable, predetermined by a specification, hardcoded in UE 115-*a*, or explicitly signaled in system information (e.g., transmitted with or as part of the system information). If the signal quality or signal strength satisfies the threshold, UE 115-*a* may camp on the neighboring cell. In other examples, if the signal quality does not satisfy the threshold, UE 115-*a* may camp on the current cell (e.g., a serving cell), which may be the cell that indicated the network configuration to UE 115-*a*.

UE 115-*a* may display available deployment options or network connectivity configurations to a user based on the availability of the network connectivity configurations, the capabilities of UE 115-*a*, and the signal quality of cells providing the network connectivity configurations. In some cases, UE 115-*a* may identify the list of available nearby radio frequencies or RF spectrum bands in the system information, and UE 115-*a* may identify network connectivity configurations available for the listed radio frequencies or RF spectrum bands. UE 115-*a* may be capable of using a number of the network connectivity configurations, and UE 115-*a* may indicate, to the user, which network connectivity configurations are available based on the capabilities of UE 115-*a*. In one example, UE 115-*a* may display available deployment options based on the deployment option being available and UE 115-*a* being capable of supporting the deployment option, regardless of the signal quality of the deployment option. In other examples, UE 115-*a* may determine which network connectivity configurations are available, and UE 115-*a* may measure the signal quality of a reference signal (e.g., a synchronization signal) from a cell providing an available network connectivity configuration. If the signal quality satisfies one or more predetermined criteria (e.g., a threshold), UE 115-*a* may indicate to the user that the network connectivity configuration is available.

In some examples, UE 115-*a* may measure signal quality for available network connectivity configurations and indicate the network connectivity configuration to the user, even if UE 115-*a* is not capable of supporting the network connectivity configuration. In other examples, UE 115-*a* may indicate a network connectivity configuration to the user based on determining the network connectivity configuration is available in the area (e.g., based on the system information). UE 115-*a* may then determine that it is capable of the network connectivity configuration, and may also determine that the signal quality of the cell providing the network connectivity configuration satisfies one or more predetermined criteria. UE 115-*a* may indicate the availability of network connectivity configurations to the user via a higher layer, such as an application layer. For example, UE 115-*a* may use a display to indicate, to the user, which deployment options are available, supported, strong in signal quality (e.g., relative to other deployment options), or any combination thereof.

UE 115-*a* may identify a cell from the list of available radio frequencies and/or RF spectrum bands for channel selection or channel reselection based on the available network configuration of the cell. In some examples, the list of available RF spectrum bands may include the frequency currently in use by UE 115-*a*. UE 115-*a* may select the serving cell (e.g., base station 105-*a*), a neighboring cell (e.g., base station 105-*b*), or a combination thereof, and retune to an RF spectrum band corresponding to the selected cell. UE 115-*a* may then camp on the selected cell to communicate using the network configuration. In such cases, the serving cell or selected cell may indicate to UE 115-*a* which network configuration to use when camping on the selected cell. In some examples, UE 115-*a* may use multiple network configurations indicated in the system information. For example, UE 115-*a* may use two or more network connectivity configurations on a selected cell. In such cases, the previous serving cell, the selected cell, or the currently camped cell may indicate which of the multiple network configurations that UE 115-*a* is to use.

In some aspects, the core network may select the network configuration based on the capabilities of UE 115-*a*, network loading, etc., and UE 115-*a* may communicate with the core network in accordance with the indicated network configuration or network connectivity configuration. UE 115-*a* may then indicate which RATs or RAT configurations are available to the user (e.g., by a display of UE 115-*a*). As an example, UE 115-*a* may indicate to an upper layer (e.g., an application layer) of UE 115-*a* if NR communications are available. Additionally or alternatively, UE 115-*a* may indicate if dual connectivity (such as EN-DC, NR E-UTRA-dual connectivity (NE-DC), next generation (NG)-E-UTRA NR-dual connectivity (NGEN-DC) (such as LTE connected via a 5GC), or other MR-DC schemes) for a RAT is available, or which mode of operation for a same RAT (e.g., sub-6 GHz and mmW communications) may be available to the user.

A network connectivity configuration may describe how UE 115-*a* communicates with the core network. A network connectivity configuration may include configurations of a newly selected RAT or a new configuration for a currently used RAT. For example, a UE 115 may be connected to an NR core network and may identify and select, or reselect, a cell for a sub-6 GHz configuration or a mmW configuration, thus selecting the same RAT but using a different deployment or network connectivity configuration for the RAT. A network connectivity configuration may indicate whether the cell is connected to EPC 215 (e.g., for LTE communications) or 5GC 230 (e.g., for NR communications). In other examples, a network connectivity configuration may include a standalone deployment or a non-standalone deployment. Additionally or alternatively, a network connectivity configuration may include: whether the cell uses split bearer communications, an anchor carrier (e.g., an LTE anchor) for a cell, which cell group is the master cell group (MCG) and which cell group is the secondary cell group (SCG) (e.g., based on the anchor carrier), or any combination thereof.

As an illustrative example of UE 115-*a* performing cell selection based on a per frequency indication of deployment schemes or network connectivity configurations, UE 115-*a* may be served by an E-UTRAN cell of base station 105-*a*. UE 115-*a* may be capable of NR communications, and UE 115-*a* may indicate such capabilities to the core network (e.g., to a network node, such as EPC 215) via base station 105-*a*. EPC 215 may indicate to base station 105-*a* that cells of base station 105-*b* are available and enabled for certain network connectivity configurations, such as NR communications. EPC 215 may also indicate to base station 105-*c* which RF spectrum bands correspond to the available cells of base station 105-*b*. Subsequently, base station 105-*a* may transmit system information including one or more information elements to UE 115-*a*. The information elements may include a list of RF spectrum bands corresponding to available cells (e.g., of base station 105-*a*, base station 105-*b*, or other base stations 105) that support NR communications. In some cases, if a service related to the capabilities of UE 115-*a* is unavailable, or not indicated in the system information, UE 115-*a* may camp on the current serving cell of base station 105-*a*. In other examples, UE 115-*a* may identify a cell of base station 105-*b* that supports NR communications, and UE 115-*a* may retune a radio chain to an RF spectrum band (e.g., indicated in the list) to camp on the identified cell of base station 105-*b* for NR communications. After camping on the cell provided by base station 105-*b*, 5GC 230 may indicate, via base station 105-*b*, a network connectivity configuration for UE 115-*a* to use while connected to the cell. In one example, the network connectivity configuration may indicate that UE 115-*a* may use a non-standalone LTE anchor (e.g., from base station 105-*a*) while connected to the 5GC network (e.g., via base station 105-*b*). In other examples, UE 115-*a* may be configurable for other network connectivity configurations.

Figure 3:
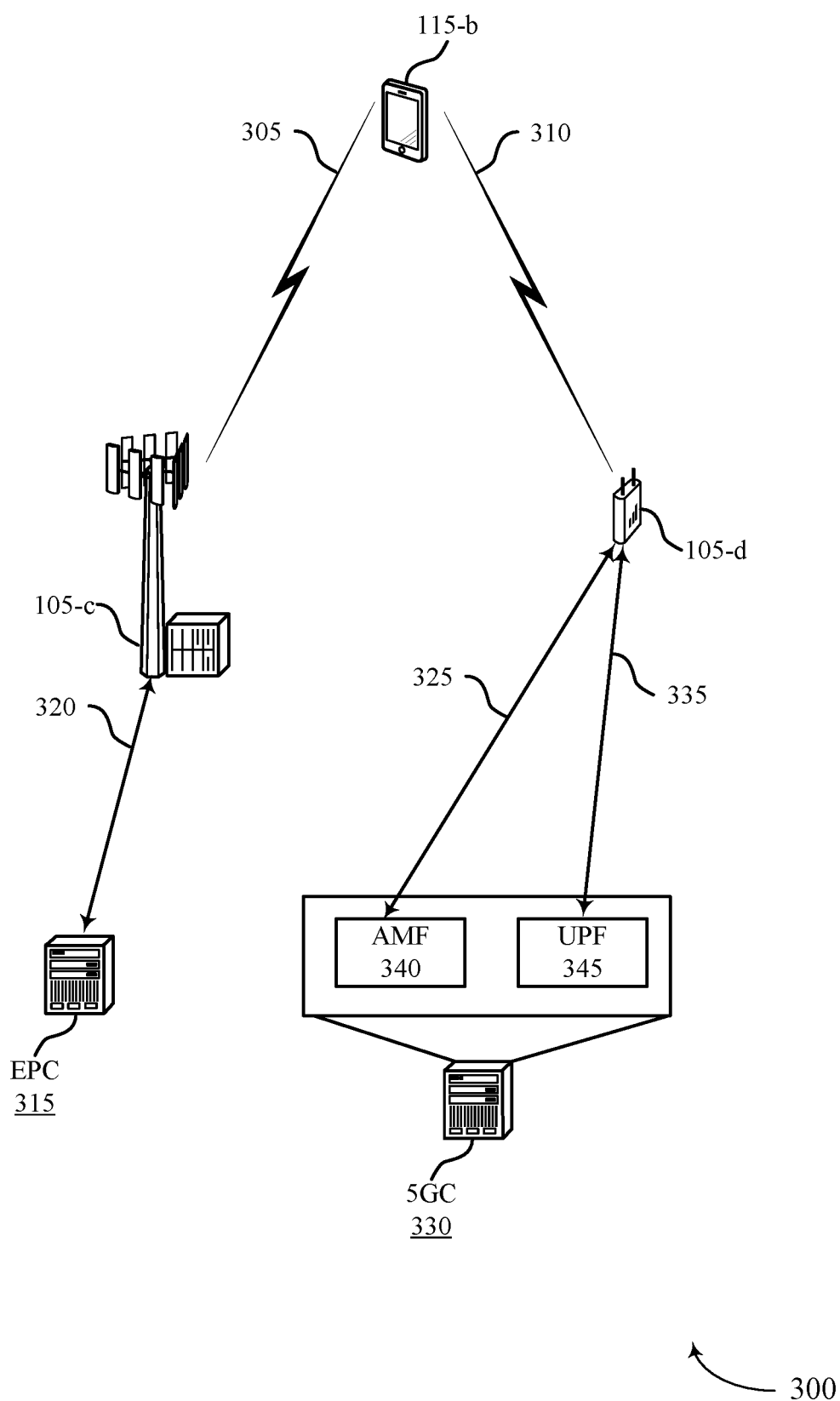

FIG. 3 illustrates an example of a network connectivity configuration 300 that supports a per frequency indication of deployment schemes in accordance with various aspects of the present disclosure. In some examples, network connectivity configuration 300 may implement aspects of wireless communications system 100. Network connectivity configuration 300 includes UE 115-*b*, which may be an example of a UE 115 as described with reference to FIG. 1. Network connectivity configuration 300 also includes base station 105-*c* and base station 105-*d*, which may each be an example of a base station 105 as described with reference to FIGS. 1 and 2. In some cases, base station 105-*c* may provide a serving cell for UE 115-*b*. In other examples, base station 105-*c* and base station 105-*d* may provide cells that UE 115-*b* is considering camping on. Base station 105-*c* may communicate with an EPC 315 using communication link 320. Base station 105-*d* may communicate with a 5GC 330 by communication link 325 and communication link 335. EPC 315 and 5GC 330 may be respective examples of an EPC 215 and a 5GC 230, as described with reference to FIG. 2. 5GC 330 may further include an SMF (not shown).

Network connectivity configuration 300 may include standalone NR communications with 5GC 330, and 5GC 330 may include a control plane function (AMF 340) and a user plan function (UPF 345). In some examples, UE 115-*b* may be served by base station 105-*d* and communicate over communication link 310. Base station 105-*d* may communicate with the AMF 340 using communication link 325 (e.g., N2) and with the UPF 345 using communication link 335 (e.g., N3).

UE 115-*b* may perform channel selection or channel reselection based on available network configurations in the radio access network (RAN). For example, UE 115-*b* may be capable of NR communications, and UE 115-*b* may indicate its capabilities to base station 105-*c*. EPC 315 may indicate to base station 105-*c* that RF spectrum bands of base station 105-*d*, base station 105-*c*, or both, are enabled for a wireless configuration corresponding to the capabilities of UE 115-*b*. EPC 315 may send network information to base station 105-*c*, and base station 105-*c* may transmit system information to UE 115-*b* over the communication link 305. The system information may include one or more information elements. In some cases, an information element may indicate an available RF spectrum band and a wireless configuration supported on the RF spectrum band. In some examples, the information element(s) of the system information transmission may include a list of available RF spectrum bands in the area. UE 115-*b* may determine that a cell of base station 105-*d* supports NR communications based on the system information, and may retune to a corresponding RF spectrum band of the list to camp on the cell for NR communications. 5GC 330 may indicate, via base station 105-*c*, a network connectivity configuration for UE 115-*b* on the cell. In some examples, UE 115-*b* may receive an indication of which network connectivity configuration to use, where the indication may be sent by EPC 315 to UE 115-*b* via base station 105-*c*. UE 115-*b* may subsequently indicate, to a user, the ability to use the network connectivity configuration, for example, by a display of UE 115-*b*.

Figure 4:
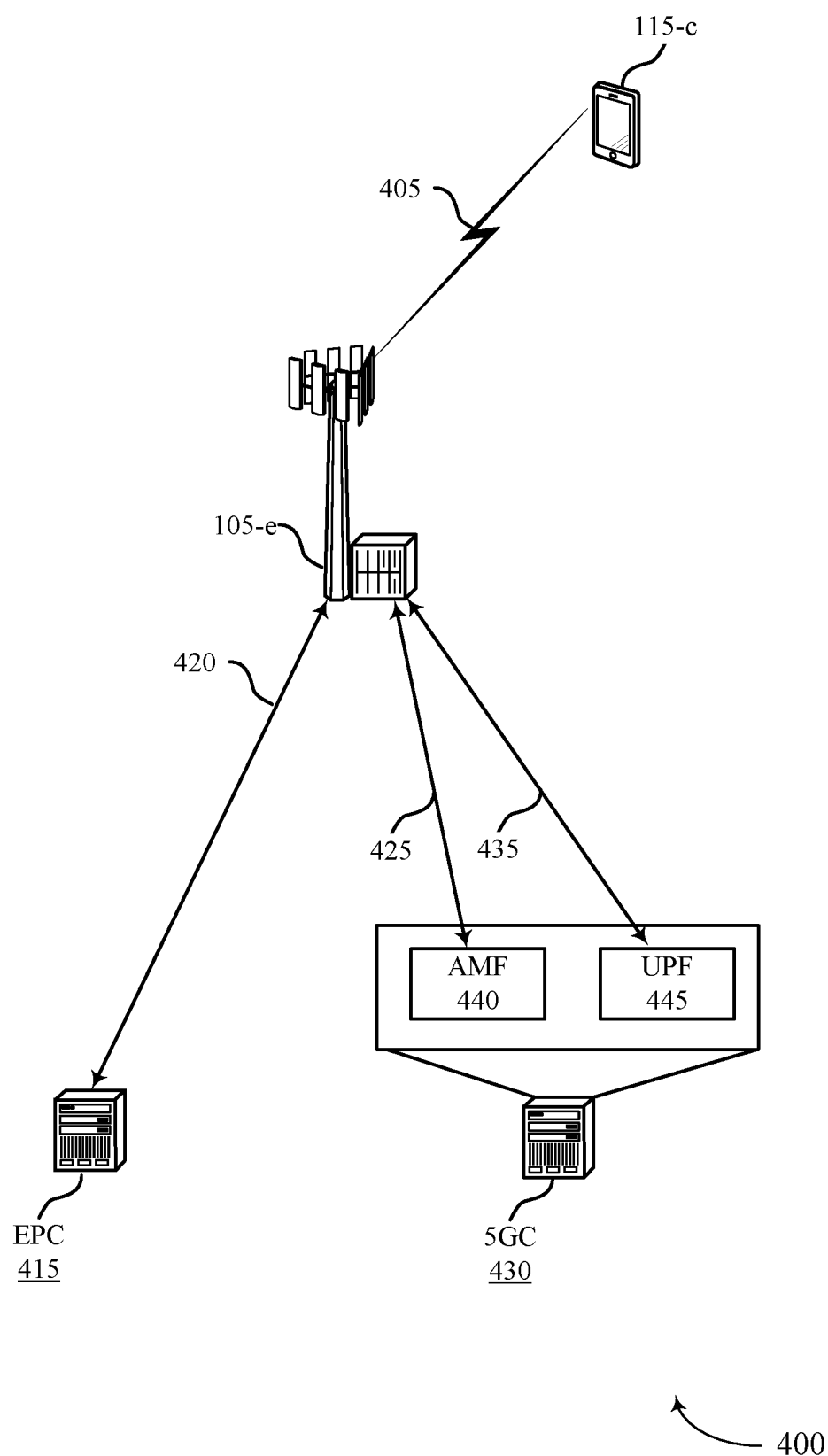

FIG. 4 illustrates an example of a network connectivity configuration 400 that supports a per frequency indication of deployment schemes in accordance with various aspects of the present disclosure. In some examples, network connectivity configuration 400 may implement aspects of wireless communications system 100. Network connectivity configuration 400 includes UE 115-*c*, which may be an example of a UE 115 as described with reference to FIG. 1. Network connectivity configuration 400 also includes base station 105-*e*, which may be an example of a base station 105 as described with reference to FIG. 1. Base station 105-*e* may be a serving cell of UE 115-*c* and capable of wireless communications using a number of different RATs. Base station 105-*e* may communicate with an EPC 415 using communication link 420 and communicate with a 5GC 430 using communication link 425 and communication link 435. EPC 415 and 5GC 430 may be respective examples of an EPC 215 and a 5GC 230 as described with reference to FIG. 2. The 5GC 430 may further include an SMF (not shown).

Network connectivity configuration 400 may include standalone LTE communications while connected to the network of 5GC 430. 5GC 430 may include an AMF 440 and a UPF 445. UE 115-*c* may be served by base station 105-*e* and communicate over communication link 405. In some cases, base station 105-*e* may communicate with the AMF 440 via communication link 425 (e.g., N2) and with the UPF 445 via communication link 435 (e.g., N3).

UE 115-*c* may perform channel selection or channel reselection based on available network configurations in the RAN. For example, UE 115-*c* may be capable of 5GC-connected LTE communications, and UE 115-*c* may indicate its capabilities to EPC 415 via base station 105-*e*. EPC 415 may indicate to base station 105-*e* that RF spectrum bands of neighboring cells are enabled for 5GC-connected LTE communications. EPC 415 may send system information to base station 105-*e* and, in turn, base station 105-*e* may transmit the system information to UE 115-*c* over the communication link 405. The system information may include one or more information elements, where an information element may indicate an available RF spectrum band and a wireless configuration supported on the RF spectrum band. In some examples, an information element of the system information may include a list of available RF spectrum bands in the area. In some examples, the list of RF spectrum bands may include RF spectrum bands corresponding to cells of base station 105-*e* that support NR communications. UE 115-*c* may select one of the cells from the list, and may retune a radio chain to the corresponding RF spectrum band to camp on the cell for NR communications. 5GC 430 may indicate, through base station 105-*e*, a network configuration for UE 115-*b* to use on the cell. When the network configuration is available, UE 115-*c* may indicate the configuration to the user (e.g., by a display on UE 115-*c*).

Figure 5:
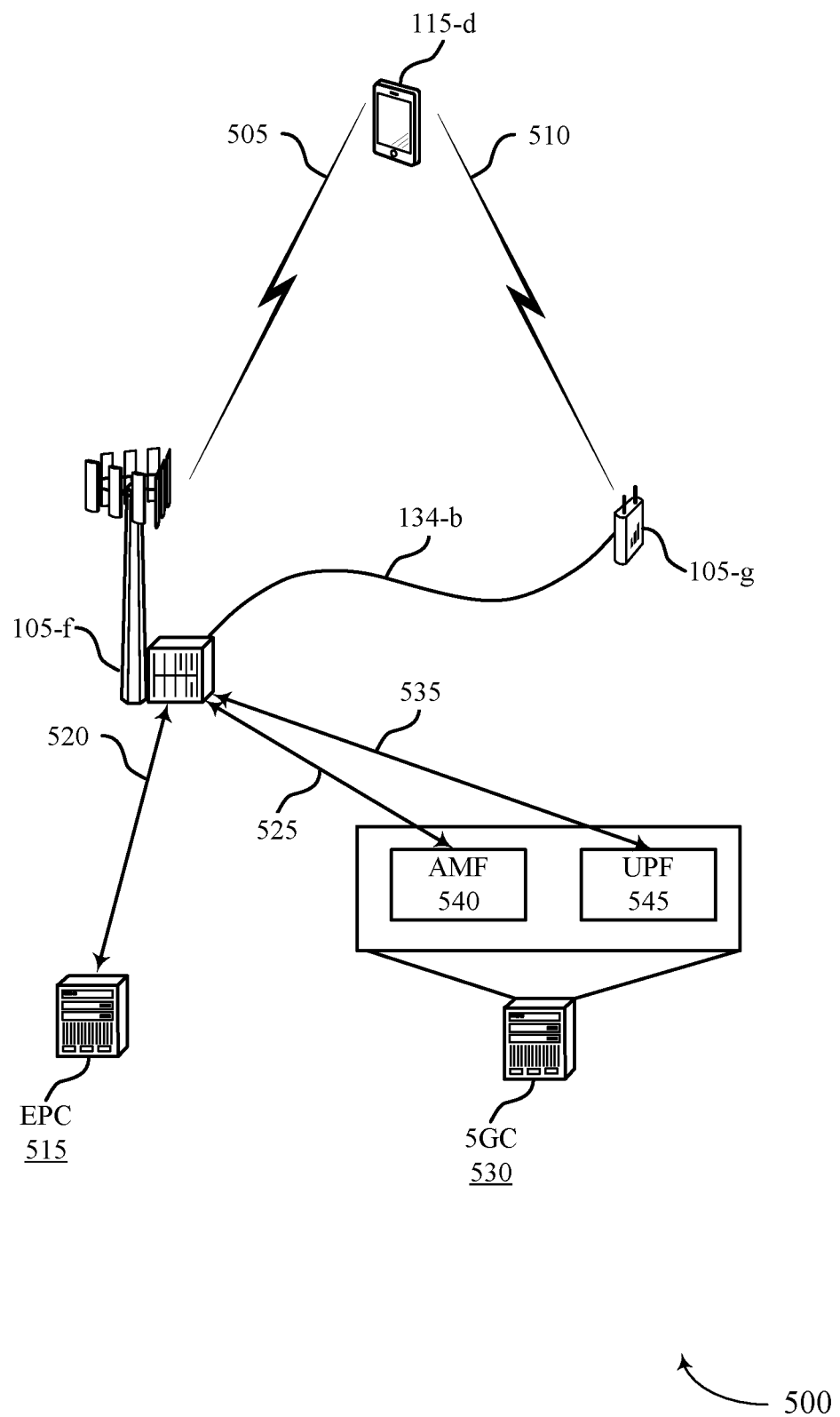

FIG. 5 illustrates an example of a network connectivity configuration 500 that supports a per frequency indication of deployment schemes in accordance with various aspects of the present disclosure. In some examples, network connectivity configuration 500 may implement aspects of wireless communications system 100. Network connectivity configuration 500 includes UE 115-*d*, which may be an example of a UE 115 as described with reference to FIG. 1. Network connectivity configuration 500 also includes base station 105-*f* and base station 105-*g*, which may each be an example of a base station 105 as described with reference to FIG. 1. Base station 105-*f* may be a serving cell of UE 115-*d*. Additionally, base station 105-*f* may be connected to an EPC 515 through communication link 520. Base station 105-*f* may also be connected to a 5GC 530 using communication link 525 and communication link 535. EPC 415 and 5GC 430 may be respective examples of an EPC 215 and a 5GC 230 as described with reference to FIG. 2. 5GC 530 may further include an SMF (not shown).

Network connectivity configuration 500 as depicted may include non-standalone NR communications with the network of 5GC 530. Network connectivity configuration 500 may support MCG split bearer communications, where the MCG corresponds to base station 105-*f* and the SCG corresponds to base station 105-*g*. Thus, UE 115-*d* may have an anchor carrier on a cell of base station 105-*f* In some examples, UE 115-*d* may be communicate with both base station 105-*f* and base station 105-*g* using communication links 505 and 510, respectively. Further, base stations 105-*f* and 105-*g* may communicate with each other over backhaul link 134-*b*. 5GC 530 may include an AMF 540 and a UPF 545. Base station 105-*f* may communicate with the AMF 540 using communication link 525 (e.g., N2) and with the UPF 545 using communication link 535 (e.g., N3).

UE 115-*d* may perform channel selection or channel reselection based on available network configurations in the RAN. For example, UE 115-*d* may be capable of non-standalone NR communications, and base station 105-*f* may receive an indication of the capabilities of UE 115-*d*. In some cases, an MME may provide base station 105-*f* an indication of UE capabilities, for example, during an S1 connection setup procedure. In other examples, base station 105-*f* may request that UE 115-*d* transmit the indication of UE capabilities (such as in cases where the UE's capabilities are not provided by the MME during 51 setup). In some cases, the UE capabilities may be provided to base station 105-*f* through another network entity, such as AMF 540. For instance, AMF 540 may provide, to base station 105-*f*, an indication of the capabilities of UE 115-*d* during N2 connection setup of communication link 525 with base station 105-*f* (e.g., for an N2 interface).

In some examples, base station 105-*f* may transmit the system information to UE 115-*d* over the communication link 505. The system information may be generated by base station 105-*f* and may include one or more information elements. An information element may indicate an available RF spectrum band and a wireless configuration supported on the RF spectrum band. In some examples, an information element of the system information may include a list of available RF spectrum bands in the area. Additionally or alternatively, an information element of the system information may include a list of available RF frequencies (e.g., a list of available absolute radio frequency channel numbers-new radio (ARFCNs-NR)) in the area. UE 115-*d* may determine that a cell of base station 105-*f* or base station 105-*g* supports NR communications and may retune to the corresponding RF spectrum band of the list, which may enable UE 115-*d* to camp on the cell for non-standalone NR communications. For example, UE 115-*d* may select a cell of base station 105-*f* In some examples, base station 105-*f* may determine a network connectivity configuration that UE 115-*d* may use on the cell, which may be based on a set of policies (e.g., a quality of service (QoS) requirement, a PDN/protocol data unit (PDU) session type, etc.).

Figure 6:
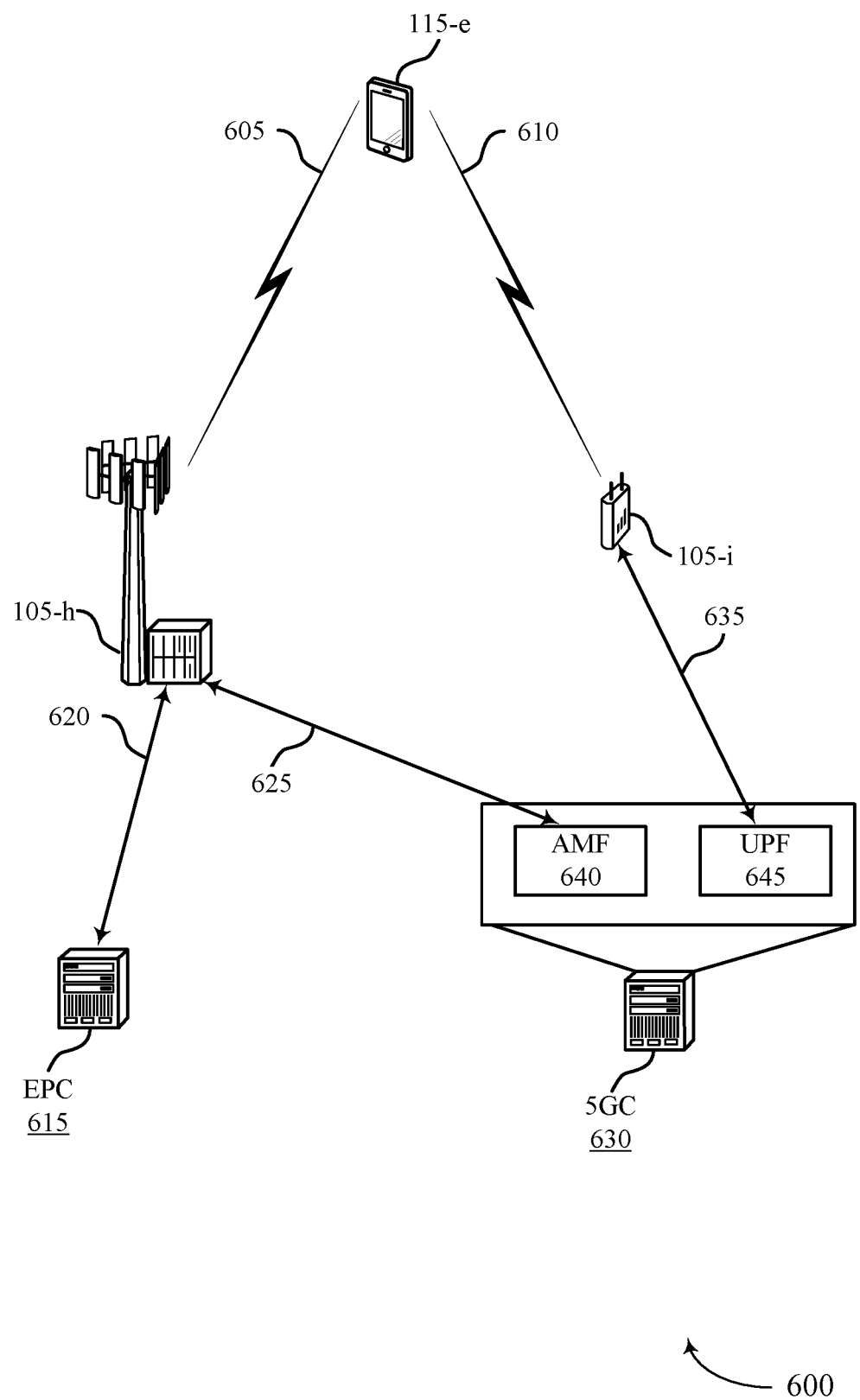

FIG. 6 illustrates an example of a network connectivity configuration 600 that supports a per frequency indication of deployment schemes in accordance with various aspects of the present disclosure. In some examples, network connectivity configuration 600 may implement aspects of wireless communications system 100. Network connectivity configuration 600 includes UE 115-*e*, which may be an example of a UE 115 as described with reference to FIG. 1. Network connectivity configuration 600 also includes base station 105-*h* and base station 105-*i*, which may each be an example of a base station 105 as described with reference to FIG. 1. Network connectivity configuration 600 may include an EPC 615 and a 5GC 630. 5GC 630 may include an AMF 640 and a UPF 645. Base station 105-*h* may provide a serving cell of UE 115-*e*. Base station 105-*h* may communicate with EPC 615 by way of communication link 620 as well as with AMF 640 of 5GC 630 through communication link 625. Base station 105-*i* may communicate with the UPF 645 of the 5GC 630 by communication link 635. EPC 615 and 5GC 630 may be respective examples of an EPC 215 and a 5GC 230 as described with reference to FIG. 2. 5GC 630 may further include an SMF (not shown).

Network connectivity configuration 600 as depicted may include non-standalone NR communications using an SCG bearer (e.g., corresponding to base station 105-*i*). Base station 105-*i* may be connected to UPF 645 of 5GC 630 by communication link 635. In some examples, UE 115-*e* may use an LTE anchor carrier on a cell of base station 105-*h*. Base station 105-*h* may be connected to AMF 640 of the 5GC 630 by communication link 625. UE 115-*e* may be served by base station 105-*i* and communicate over communication link 610.

UE 115-*e* may perform channel selection or channel reselection based on available network configurations in the RAN. For example, UE 115-*e* may be capable of non-standalone NR communications, and base station 105-*h* may receive an indication of the capabilities of UE 115-*f*. In such cases, either EPC 615 or MME 640 may provide an indication of the capabilities of UE 115-*e*, which may be based on a type of MR-DC scheme used in network connectivity configuration 600. As such, the UE capabilities may be provided to base station 105-*h* during connection setup with the respective network entity (e.g., either EPC 615 or AMF 640). EPC 615 may indicate to base station 105-*h* that cells of base station 105-*h*, base station 105-*i*, or another nearby base station 105, are enabled for NR communications corresponding to the capabilities of UE 115-*e*. The EPC 615 may send information related to the available wireless configurations to base station 105-*h*, and base station 105-*h* may transmit system information to UE 115-*e* over communication link 605. The system information may include a number of information elements, one of which may include a list of RF spectrum bands corresponding to cells of base station 105-*h*, base station 105-*i*, or other neighboring cells. The indicated cells may be enabled for NR communications or other wireless configurations corresponding to the capabilities of UE 115-*e*. UE 115-*e* may determine that a cell of base station 105-*i* supports non-standalone NR communications and retune to an RF spectrum band of the list to camp the cell for non-standalone NR communications. 5GC 630 may indicate, via base station 105-*i*, a network connectivity configuration for UE 115-*e* on the cell.

Figure 7:
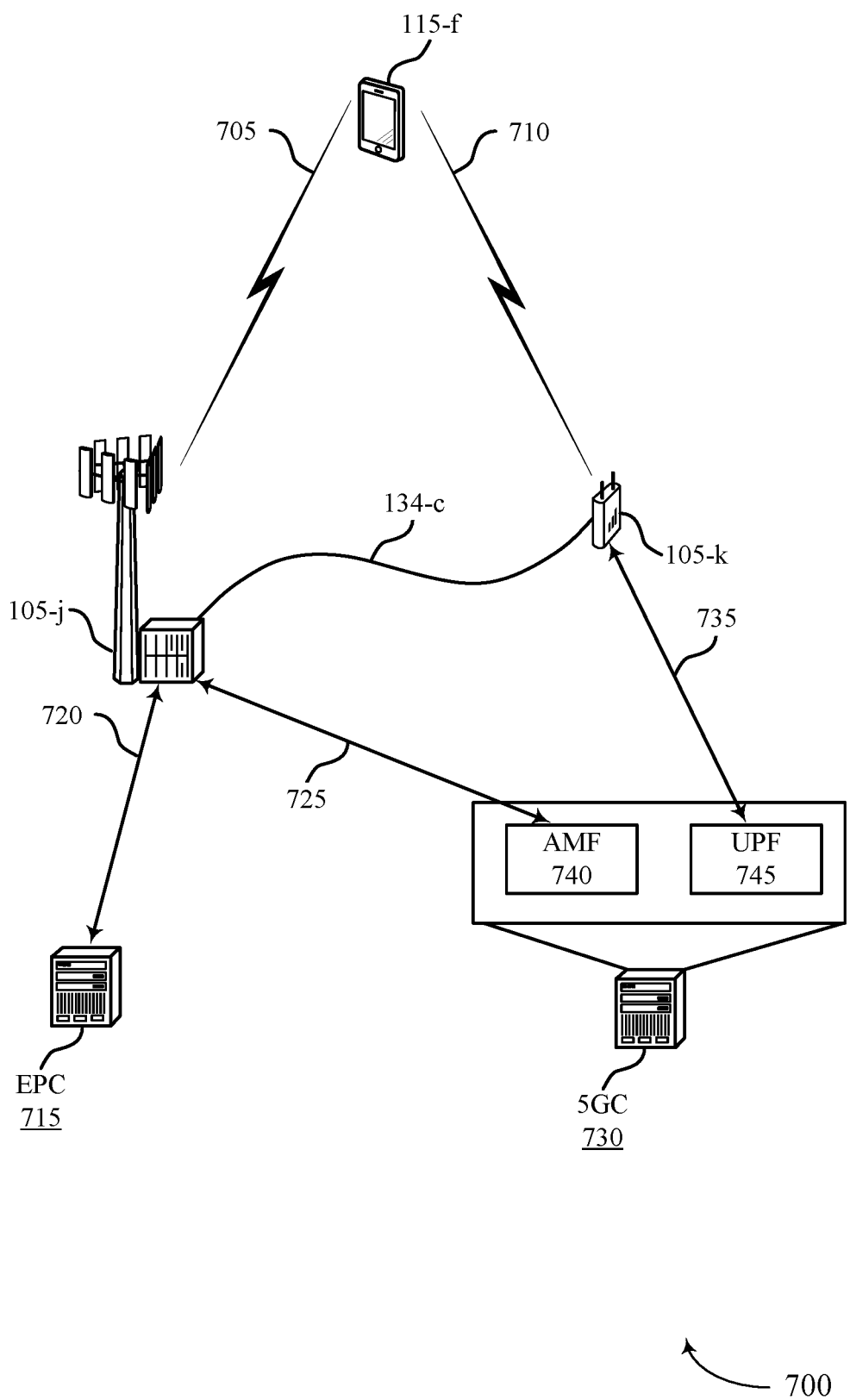

FIG. 7 illustrates an example of a network connectivity configuration 700 that supports a per frequency indication of deployment schemes in accordance with various aspects of the present disclosure. In some examples, network connectivity configuration 700 may implement aspects of wireless communications system 100. Network connectivity configuration 700 includes UE 115-*f*, which may be an example of a UE 115 as described with reference to FIG. 1. Network connectivity configuration 700 also includes base station 105-*j* and base station 105-*k*, which may each be an example of a base station 105 as described with reference to FIG. 1. Base station 105-*j* may be a serving cell of UE 115-*f* Base station 105-*j* may be connected to an EPC 715 through communication link 720. Base station 105-*j* may also be connected to a 5GC 730 through communication link 725 and communication link 735. The EPC 715 and the 5GC 730 may be respective examples of an EPC 215 and a 5GC 230 as described with reference to FIG. 2. The 5GC 730 may further include an SMF (not shown).

Network connectivity configuration 700 as depicted may include non-standalone NR communications with the network of 5GC 730. Network connectivity configuration 700 may support MCG split bearer communications, where the MCG corresponds to base station 105-*j* and the SCG corresponds to base station 105-*k*. Thus, UE 115-*f* may have an anchor carrier on a cell of base station 105-*j*. UE 115-*f* may be communicate with both base station 105-*j* and base station 105-*k* using communication links 705 and 710, respectively, and the two base stations 105 may communicate together using backhaul link 134-*b*. 5GC 730 may include an AMF 740 and a UPF 745. Base station 105-*k* may communicate with AMF 740 via communication link 725 (e.g., N2) and with UPF 745 via communication link 735 (e.g., N3).

UE 115-*f* may perform channel selection or channel reselection based on available network configurations in the RAN. For example, UE 115-*f* may be capable of non-standalone NR communications, and base station 105-*j* may receive an indication of the capabilities of UE 115-*f*. For instance, an MME may provide base station 105-*j* an indication of UE capabilities, for example, during an S1 connection setup procedure. In other examples, base station 105-*j* may request that UE 115-*f* transmit the indication of UE capabilities (such as in cases where the capabilities of UE 115-*f* are not provided by the MME during 51 setup). In some examples, UE capabilities may be provided to base station 105-*j* through another network entity, such as AMF 740. For instance, AMF 740 may provide, to base station 105-*j*, an indication of the capabilities of UE 115-*f* during N2 connection setup of communication link 725 with base station 105-*f*.

In some examples, base station 105-*j* may transmit the system information to UE 115-*f* over communication link 705. The system information may be generated by base station 105-*j* and may include a number of information elements, one of which may include a list of RF spectrum bands or frequencies (e.g., having respective ARFCNs-NR) corresponding to cells of base station 105-*k* and other neighboring cells enabled for non-standalone NR communications or other wireless configurations. UE 115-*f* may determine that a cell of base station 105-*j* or base station 105-*k* supports NR communications and retune to an RF spectrum band of the list to camp on the cell for non-standalone NR communications. For example, UE 115-*f* may select an RF spectrum band of a cell of base station 105-*j*. In some cases, base station 105-*j* may determine a network connectivity configuration for UE 115-*f* to implement on the cell. The network connectivity configuration may be based on, for example, one or more policies such as QoS requirements, PDN/PDU session types, and the like.

Figure 8:
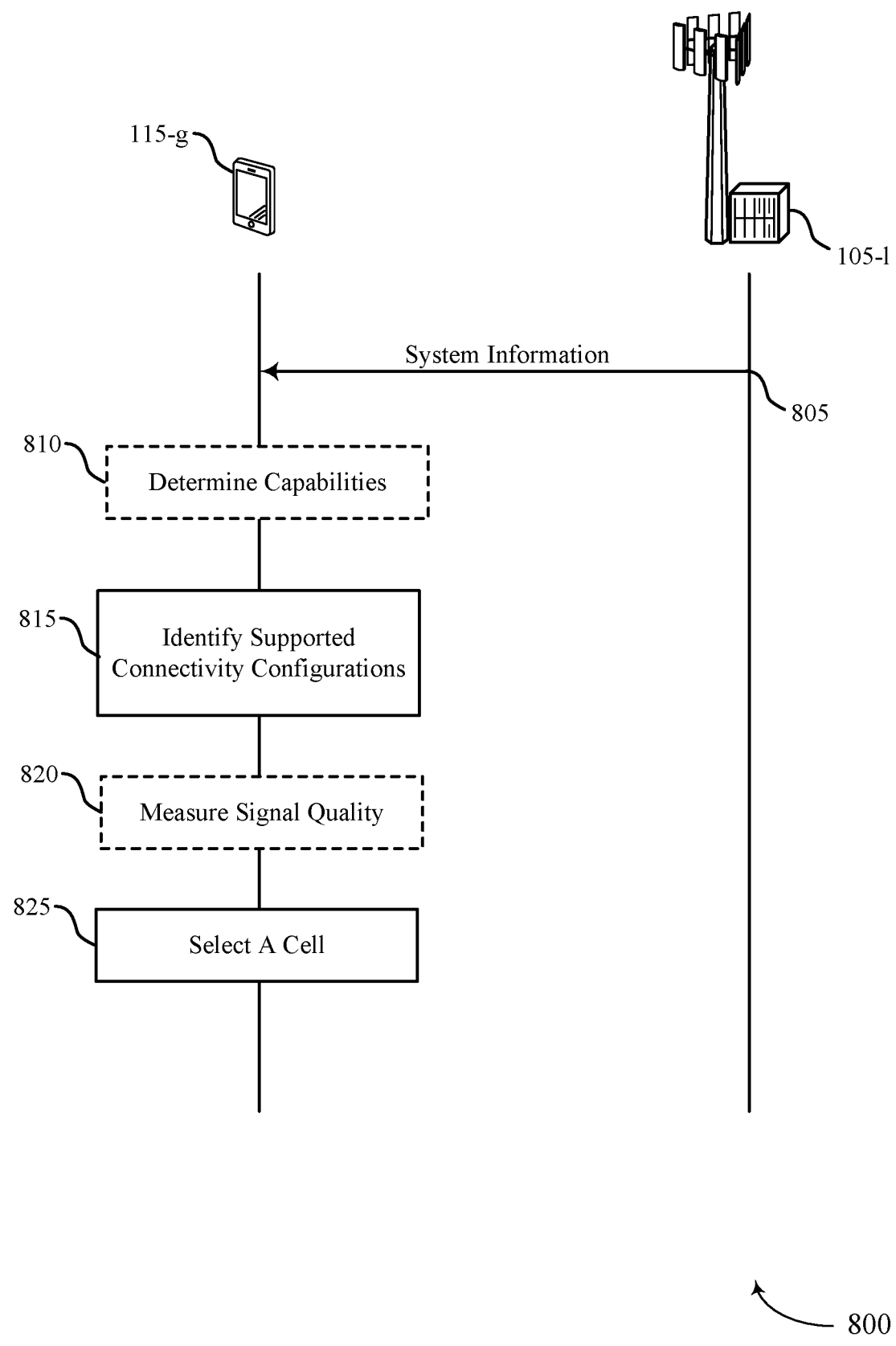
FIGS. 8 and 9 illustrate examples of process flows in a system that supports a per frequency indication of deployment schemes in accordance with aspects of the present disclosure.

FIG. 8 illustrates an example of a process flow 800 in a system that supports a per frequency indication of deployment schemes in accordance with various aspects of the present disclosure. In some examples, process flow 800 may implement aspects of wireless communications system 100. Process flow 800 includes UE 115-*g* and base station 105-*l*, which may be respective examples of a UE 115 and a base station 105 as described with reference to FIG. 1. In some examples, base station 105-*l* may provide a serving cell of UE 115-*g*. In other examples, UE 115-*g* may consider camping on a cell of base station 105-*l*.

At 805, UE 115-*g* may receive system information from base station 105-*l*. In some examples, the system information may include an information element indicating one or more radio frequencies or RF spectrum bands available for use at a second cell and may also indicate one or more network connectivity configurations. Each of the one or more radio frequencies or RF spectrum bands may be associated with at least one of the one or more network connectivity configurations of the second cell. The system information may include information relevant to services, features, or network connectivity configurations supported by UE 115-*g*. In some examples, the system information may be a system information block (SIB) that includes a list of radio frequencies or RF spectrum bands available at multiple neighboring cells. In some examples, the system information may include information related to RATs in the nearby area, for example supported by the neighboring cells using the radio frequencies or RF spectrum bands. At 810, UE 115-*g* may, in some cases, determine its capabilities. For example, UE 115-*g* may identify its capability to support various network connectivity configurations.

At 815, UE 115-*g* may identify which network connectivity configurations are supported or available through a cell or from a base station 105, such as base station 105-*l* or a neighboring base station 105. In some examples, the one or more network connectivity configurations may include a core network that operates using a different RAT than the RAT of the first cell, or the second cell, or both the first cell and the second cell. In some examples, the one or more network connectivity configurations may include a standalone deployment of the second cell, or an assisted access (e.g., dual connectivity) deployment of the first cell and the second cell, or a combination thereof.

At 820, UE 115-*g* may, in some examples, receive one or more synchronization signals from a second cell and measure the signal quality or signal strength of the second cell based on the synchronization signals. In some examples, the second cell may be a cell of base station 105-*l*, or the second cell may be of another base station 105 not shown. UE 115-*g* may perform a measurement of the received synchronization signals.

At 825, UE 115-*g* may select (or reselect, in some examples) a cell to use for wireless communications. Selecting a cell may include camping on the selected cell or reselected cell. In some examples, UE 115-*g* may select the cell based on the availability of network connectivity configurations, capabilities of UE 115-*g*, signal quality or signal strength of nearby cells, or any combination thereof. In some examples, UE 115-*g* may select a cell of base station 105-*l*. In some examples, UE 115-*g* may determine that a service is unavailable through the second cell, and selecting the cell may include camping on a cell of base station 105-*l*. In some examples, selecting the cell may be based on the measurements of the received synchronization signals.

Figure 9:
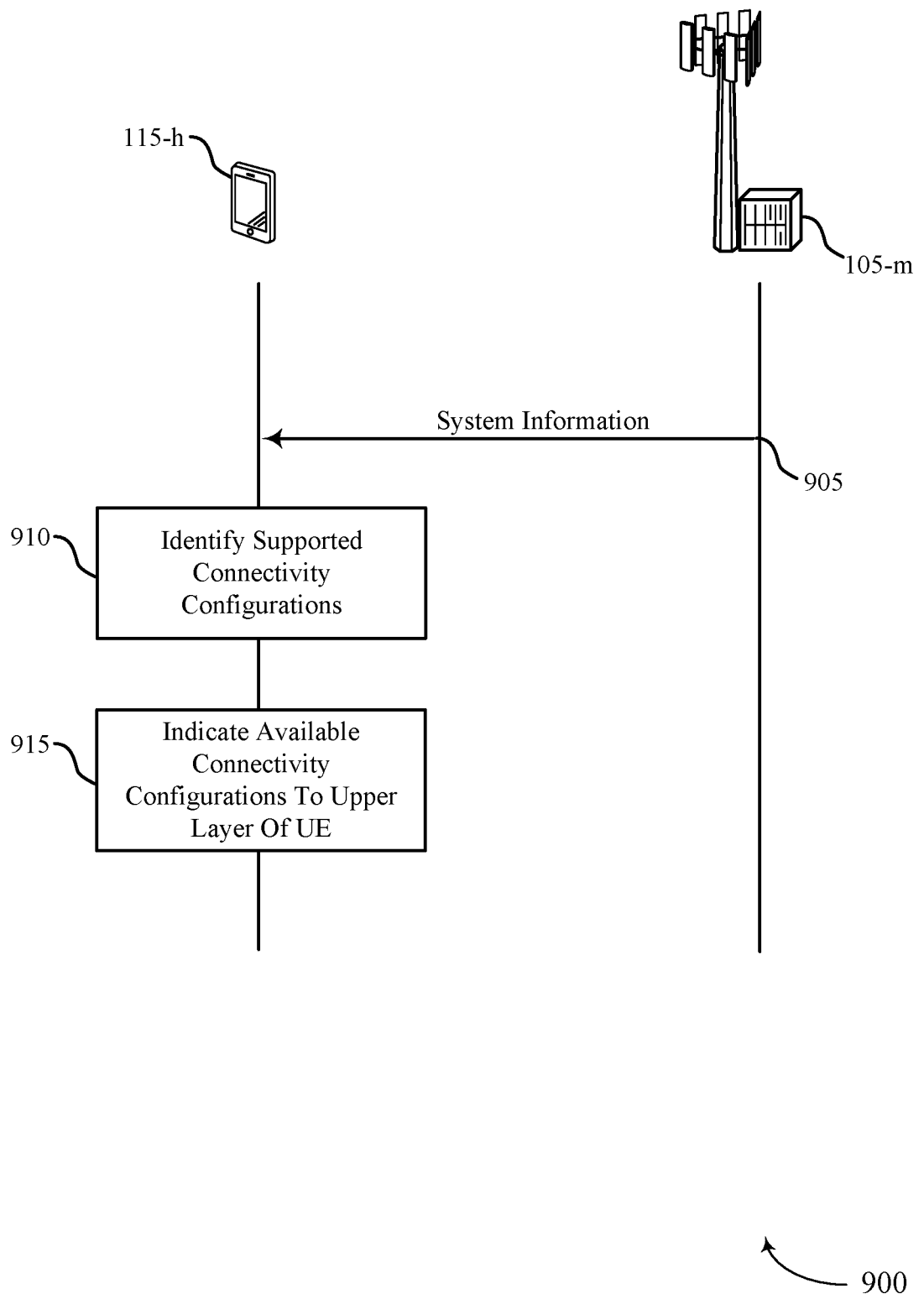

FIG. 9 illustrates an example of a process flow 900 in a system that supports a per frequency indication of deployment schemes in accordance with various aspects of the present disclosure. In some examples, process flow 900 may implement aspects of wireless communications system 100. Process flow 900 includes UE 115-*h*, which may be an example of a UE 115 as described with reference to FIG. 1. Process flow also includes base station 105-*m*, which may be an example of a base station 105 as described with reference to FIG. 1. In some examples, base station 105-*m* may provide a serving cell for UE 115-*h*. In other examples, UE 115-*h* may consider camping a cell of base station 105-*m* or base station 105 not shown.

At 905, UE 115-*h* may receive system information from base station 105-*m*. In some examples, the system information may include an information element indicating one or more radio frequencies or RF spectrum bands available for use at a second cell. The information element may also indicate one or more network connectivity configurations, and each of the one or more radio frequencies or RF spectrum bands may be associated with at least one of the one or more network connectivity configurations of the second cell. The system information may include information relevant to services, features, or network connectivity configurations supported by UE 115-*h*. In some examples, the system information may include a SIB that includes a list of radio frequencies or RF spectrum bands available at multiple neighboring cells. In some examples, the system information may include information related to RATs in the nearby area, for example supported by the neighboring cells on the radio frequencies or RF spectrum bands.

At 910, UE 115-*h* may identify which network connectivity configurations are available. In some examples, the one or more network connectivity configurations may include a core network that operates using a different RAT than the RAT of the first cell, or the second cell, or both the first cell and the second cell. In some examples, the one or more network connectivity configurations may include a standalone deployment of the second cell, or an assisted access (e.g., dual connectivity) deployment of the first cell and the second cell, or a combination thereof.

At 915, UE 115-*h* indicate available wireless connectivity configurations, services, or feature to the user. For example, UE 115-*h* may indicate, by a higher layer of UE 115-*h*, which wireless connectivity configurations, services, or feature are available. In some examples, UE 115-*h* may indicate the availabilities through a display of UE 115-*h*.

Figure 10:
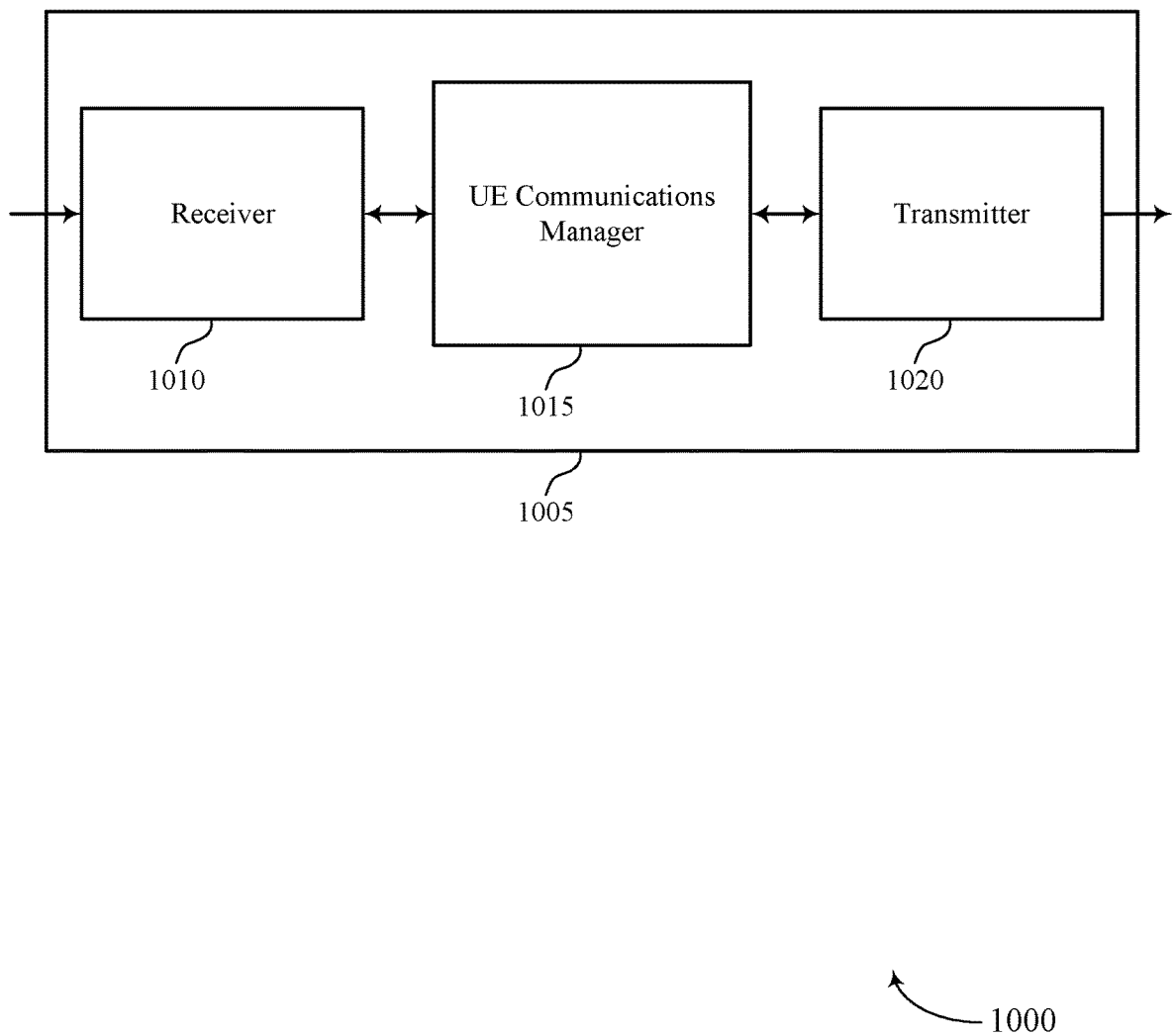
FIGS. 10 through 12 show block diagrams of a device that supports a per frequency indication of deployment schemes in accordance with aspects of the present disclosure.

FIG. 10 shows a block diagram 1000 of a wireless device 1005 that supports a per frequency indication of deployment schemes in accordance with aspects of the present disclosure. Wireless device 1005 may be an example of aspects of a UE 115 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to per frequency indication of deployment schemes, etc.). Information may be passed on to other components of the device. The receiver 1010 may be an example of aspects of the transceiver 1335 described with reference to FIG. 13. The receiver 1010 may utilize a single antenna or a set of antennas.

UE communications manager 1015 may be an example of aspects of the UE communications manager 1315 described with reference to FIG. 13. UE communications manager 1015 and/or at least some of its various sub-components may be implemented in hardware, software executed by a processor, firmware, or any combination thereof. If implemented in software executed by a processor, the functions of the UE communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1015 may receive, from a first cell, system information including an information element indicating one or more radio frequencies or RF spectrum bands available for use at a second cell and one or more network connectivity configurations, each of the one or more radio frequencies or RF spectrum bands associated with at least one of the one or more network connectivity configurations and identify a capability of the UE 115 to support the one or more network connectivity configurations indicated by the information element. In some cases, UE communications manager 1015 may select the first cell, or the second cell, or a combination thereof, to communicate with the core network based on the received information element and the identified capability. Alternatively, UE communications manager 1015 may provide, to an upper layer of the UE 115, an indication of an availability of the first cell, or the second cell, or a combination thereof, based at least in part on the received information element and the identified capability.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
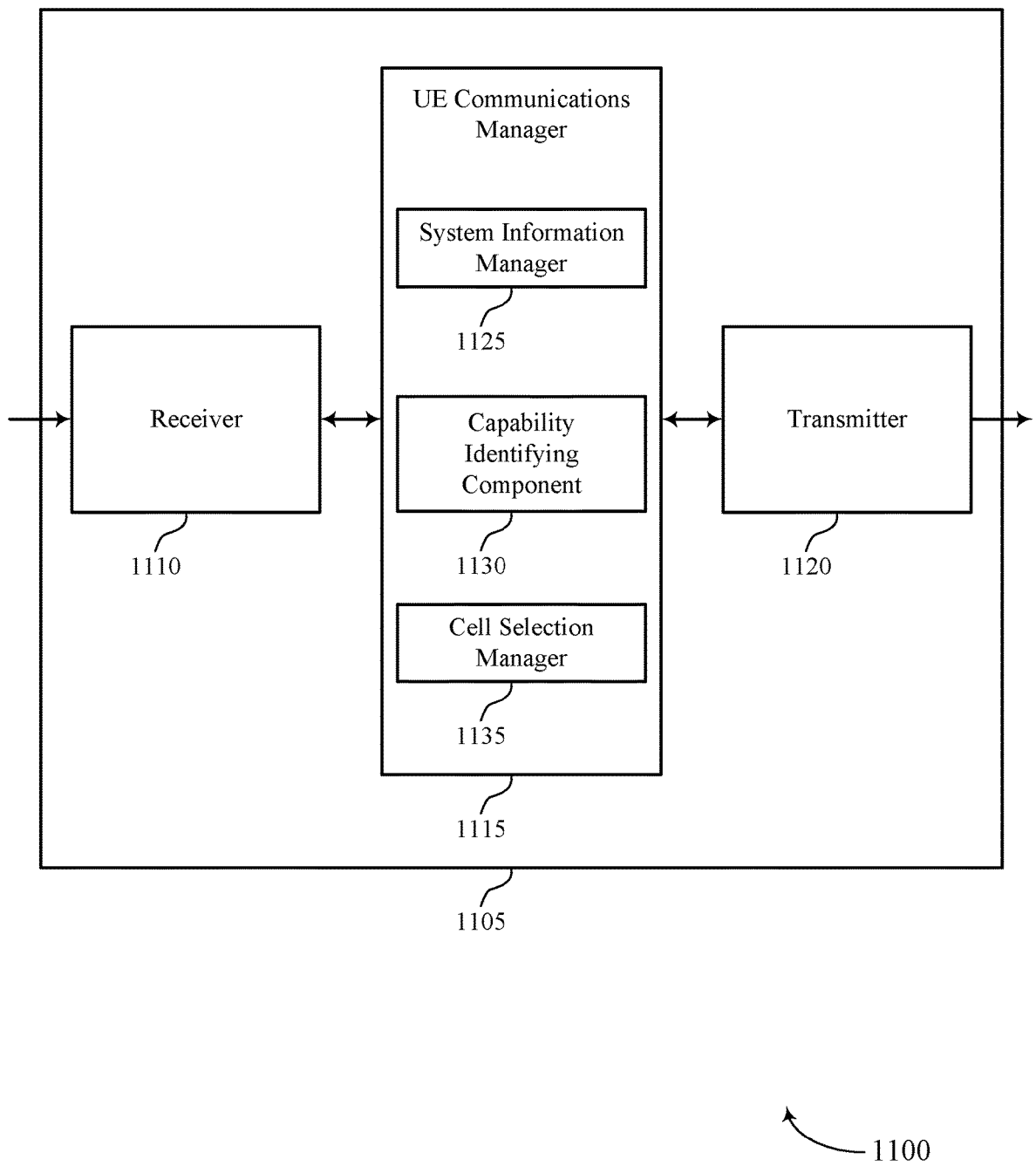

FIG. 11 shows a block diagram 1100 of a wireless device 1105 that supports a per frequency indication of deployment schemes in accordance with aspects of the present disclosure. Wireless device 1105 may be an example of aspects of a wireless device 1005 or a UE 115 as described with reference to FIG. 10. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to per frequency indication of deployment schemes, etc.). Information may be passed on to other components of the device. The receiver 1110 may be an example of aspects of the transceiver 1335 described with reference to FIG. 13. The receiver 1110 may utilize a single antenna or a set of antennas.

UE communications manager 1115 may be an example of aspects of the UE communications manager 1315 described with reference to FIG. 13. UE communications manager 1115 may also include system information manager 1125, capability identifying component 1130, and cell selection manager 1135.

System information manager 1125 may receive, from a first cell, system information including an information element indicating one or more radio frequencies or RF spectrum bands available for use at a second cell and one or more network connectivity configurations, each of the one or more radio frequencies or RF spectrum bands associated with at least one of the one or more network connectivity configurations. System information manager 1125 may receive, as part of the system information, a second information element that is associated with the radio frequencies or the RF spectrum bands in use by a third cell. The second information element may indicate a second network connectivity configuration (e.g., from the one or more network connectivity configurations) for access to the core network via the third cell, and the second network connectivity configuration may be different from a first network connectivity configuration supported by the UE 115. In some cases, system information manager 1125 may select the second cell or the third cell based on the identified capability. In some cases, the system information includes a SIB that includes a list of one or more radio frequencies, or one or more RF spectrum bands available at a set of neighboring cells.

Capability identifying component 1130 may identify a capability of the UE 115 to support the one or more network connectivity configurations indicated by the information element and transmit an indication of the identified capability to the first cell. In some cases, the one or more network connectivity configurations include a standalone deployment of the second cell, or a dual connectivity deployment of the first cell and the second cell, or a combination thereof.

Cell selection manager 1135 may select the first cell, or the second cell, or a combination thereof, to communicate with the core network based on the received information element and the identified capability or provide, to an upper layer of the UE 115, an indication of the selected first cell, or the selected second cell, or a combination thereof. In some cases, the selection of a cell includes reselecting the first cell or the second cell based on the received information element and the identified capability.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
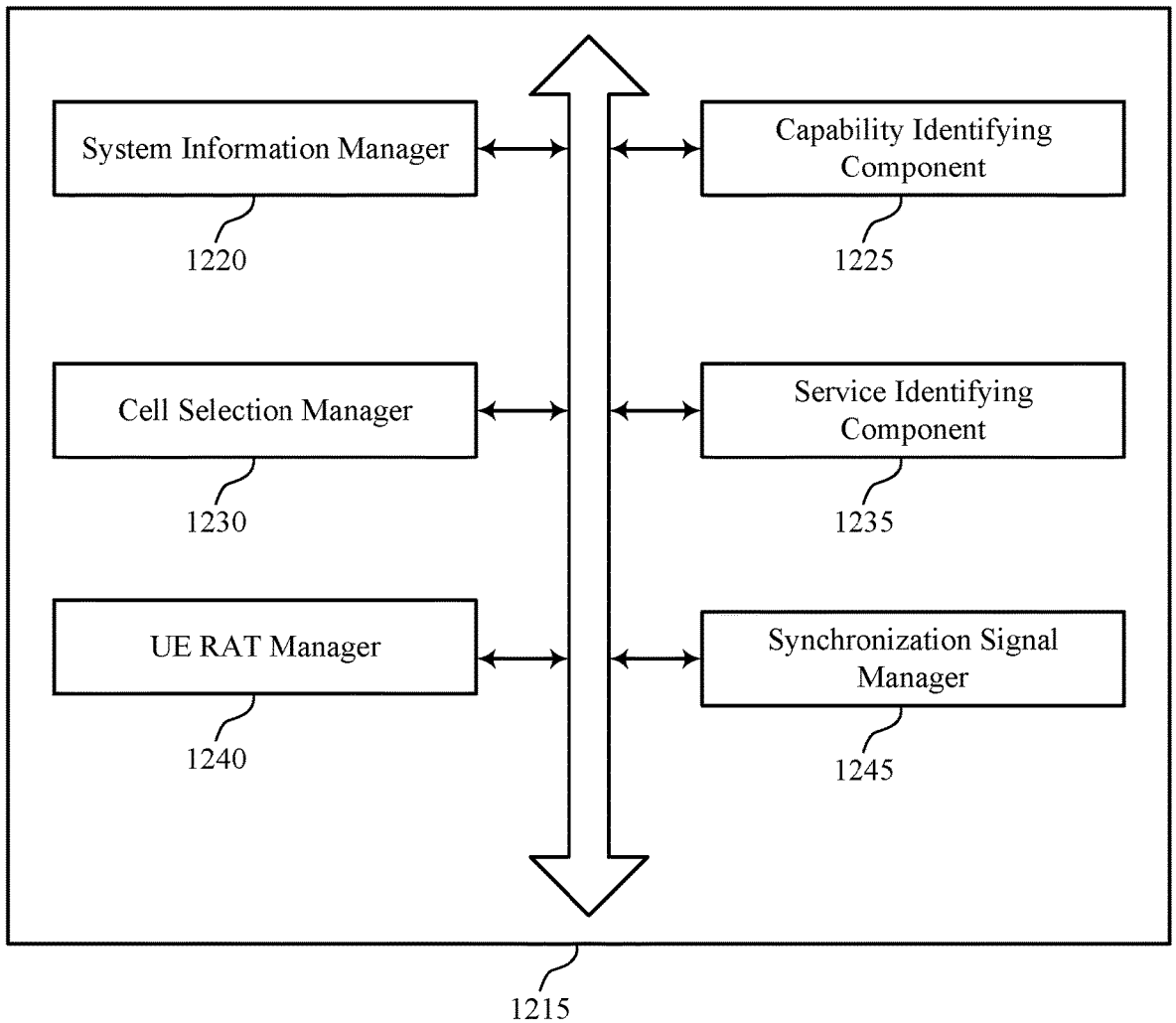

FIG. 12 shows a block diagram 1200 of a UE communications manager 1215 that supports a per frequency indication of deployment schemes in accordance with aspects of the present disclosure. The UE communications manager 1215 may be an example of aspects of a UE communications manager 1015, a UE communications manager 1115, or a UE communications manager 1315 described with reference to FIGS. 10, 11, and 13. The UE communications manager 1215 may include system information manager 1220, capability identifying component 1225, cell selection manager 1230, service identifying component 1235, UE RAT manager 1240, synchronization signal manager 1245, and UE RAT manager 1250. Each of these modules may communicate, directly or indirectly, with one another (e.g., via one or more buses).

System information manager 1220 may receive, from a first cell, system information including an information element indicating one or more radio frequencies or RF spectrum bands available for use at a second cell and one or more network connectivity configurations. Each of the one or more radio frequencies or RF spectrum bands may be associated with at least one of the one or more network connectivity configurations. System information manager 1220 may receive, as part of the system information, a second information element that is associated with the radio frequencies or the RF spectrum bands in use by a third cell. The second information element may indicate a second network connectivity configuration for access to the core network via the third cell, where the second network connectivity configuration is different from a first network connectivity configuration supported by the UE 115. In some cases, system information manager 1220 may select the second cell or the third cell based on the identified capability. In some cases, the system information includes a SIB that includes a list of one or more radio frequencies, or one or more RF spectrum bands available at a set of neighboring cells.

Capability identifying component 1225 may identify a capability of the UE 115 to support the one or more network connectivity configurations indicated by the information element and transmit an indication of the identified capability to the first cell. In some cases, the one or more network connectivity configurations include a standalone deployment of the second cell, or a dual connectivity deployment of the first cell and the second cell, or a combination thereof.

Cell selection manager 1230 may select the first cell, or the second cell, or a combination thereof, to communicate with the core network based on the received information element and the identified capability or provide, to an upper layer of the UE 115, an indication of the selected first cell, or the selected second cell, or a combination thereof. In some cases, selecting the first cell, or the second cell, or both, may include reselecting the first cell or the second cell based on the received information element and the identified capability.

Service identifying component 1235 may identify a service to use at the UE 115. Service identifying component 1235 may determine whether the identified service is available through the second cell based on the received information element, where the first cell is selected based on the identification of the capability of the UE 115 to support the one or more network connectivity configurations indicated by the information element. In some examples, service identifying component 1235 may determine that the identified service is available through the second cell. In some aspects, selecting the first cell includes camping on the first cell, or the second cell, or a combination thereof based on the availability of the service. In some cases, service identifying component 1235 may determine that the identified service is unavailable through the second cell, where selecting the first cell includes camping on the first cell based on the unavailability of the identified service.

UE RAT manager 1240 may manage RAT configurations for the UE 115. In some cases, the one or more network connectivity configurations include core network that operates using a different RAT than the RAT of the first cell, or the second cell, or both the first cell and the second cell. In some cases, the RAT of the first cell, the second cell, or both, includes an E-UTRA RAT and the different RAT includes a NR RAT. Additionally or alternatively, the RAT of the first cell, the second cell, or both, may include the NR RAT and the different RAT may be an E-UTRA RAT.

Synchronization signal manager 1245 may receive one or more synchronization signals from the second cell and may perform a measurement of the received one or more synchronization signals. In some examples, selecting the first cell is based on the measurement. In some cases, synchronization signal manager 1245 may determine that the measurement of the received one or more synchronization signals satisfies predetermined one or more criteria, where selecting the first cell includes camping on the first cell, or the second cell, or a combination thereof. Additionally or alternatively, synchronization signal manager 1245 may determine that the measurement of the received one or more synchronization signals fails to satisfy predetermined one or more criteria, where selecting a cell includes camping on the first cell. In some cases, the synchronization signal includes a PSS, or a SSS, or a combination thereof.

Figure 13:
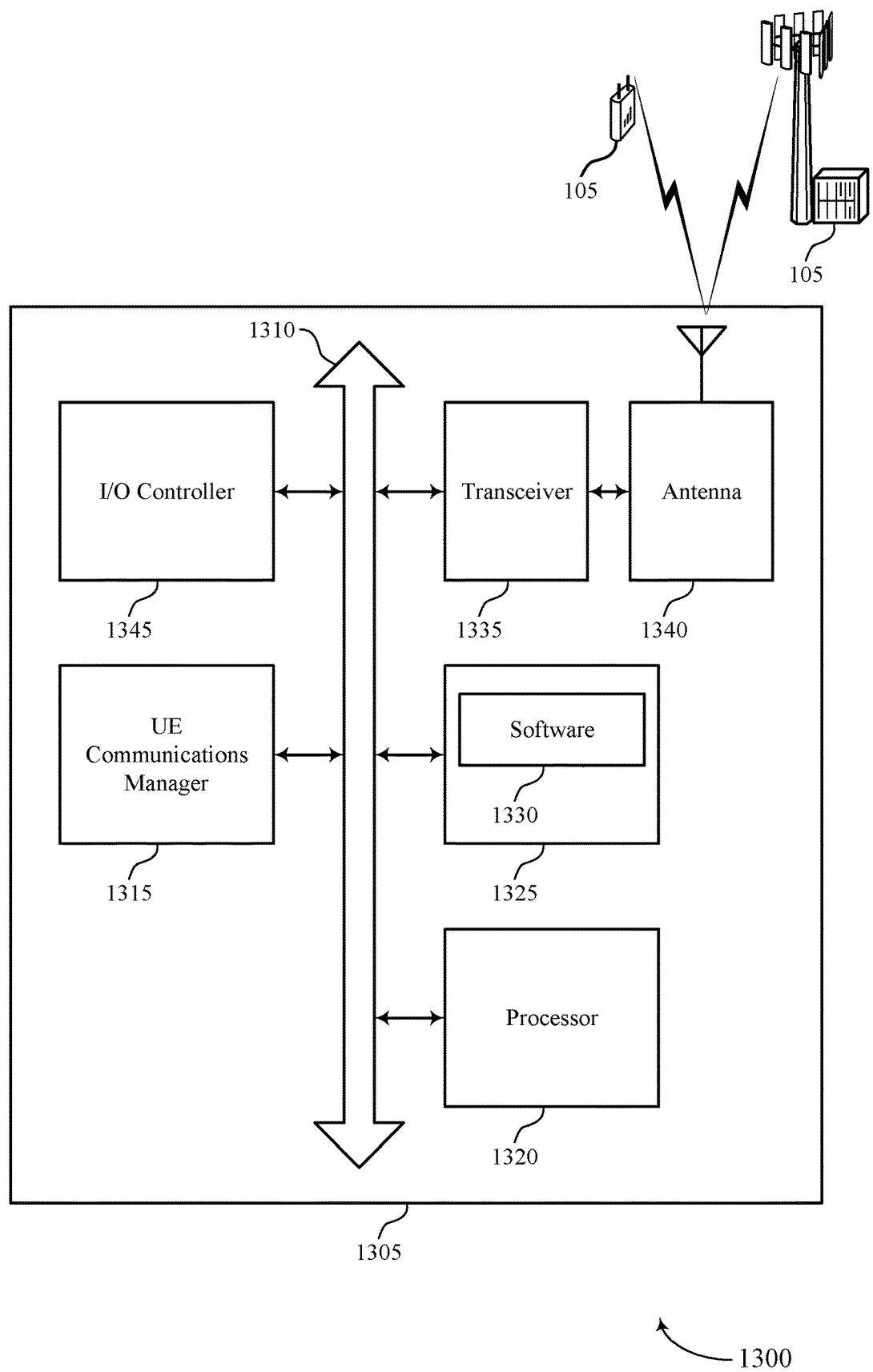
FIG. 13 illustrates a block diagram of a system including a user equipment (UE) that supports a per frequency indication of deployment schemes in accordance with aspects of the present disclosure.

FIG. 13 shows a diagram of a system 1300 including a device 1305 that supports a per frequency indication of deployment schemes in accordance with aspects of the present disclosure. Device 1305 may be an example of or include the components of wireless device 1005, wireless device 1105, or a UE 115 as described above, e.g., with reference to FIGS. 10 and 11. Device 1305 may include components for bi-directional voice and data communications including components for transmitting and receiving communications, including UE communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105. For example, device 1305 may communicate wirelessly with a gNB, an eNB, or both, according to deployment options or network connectivity configurations as described with reference to FIGS. 2 through 9.

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting per frequency indication of deployment schemes).

Memory 1325 may include random-access memory (RAM) and read-only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

Software 1330 may include code to implement aspects of the present disclosure, including code to support per frequency indication of deployment schemes. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
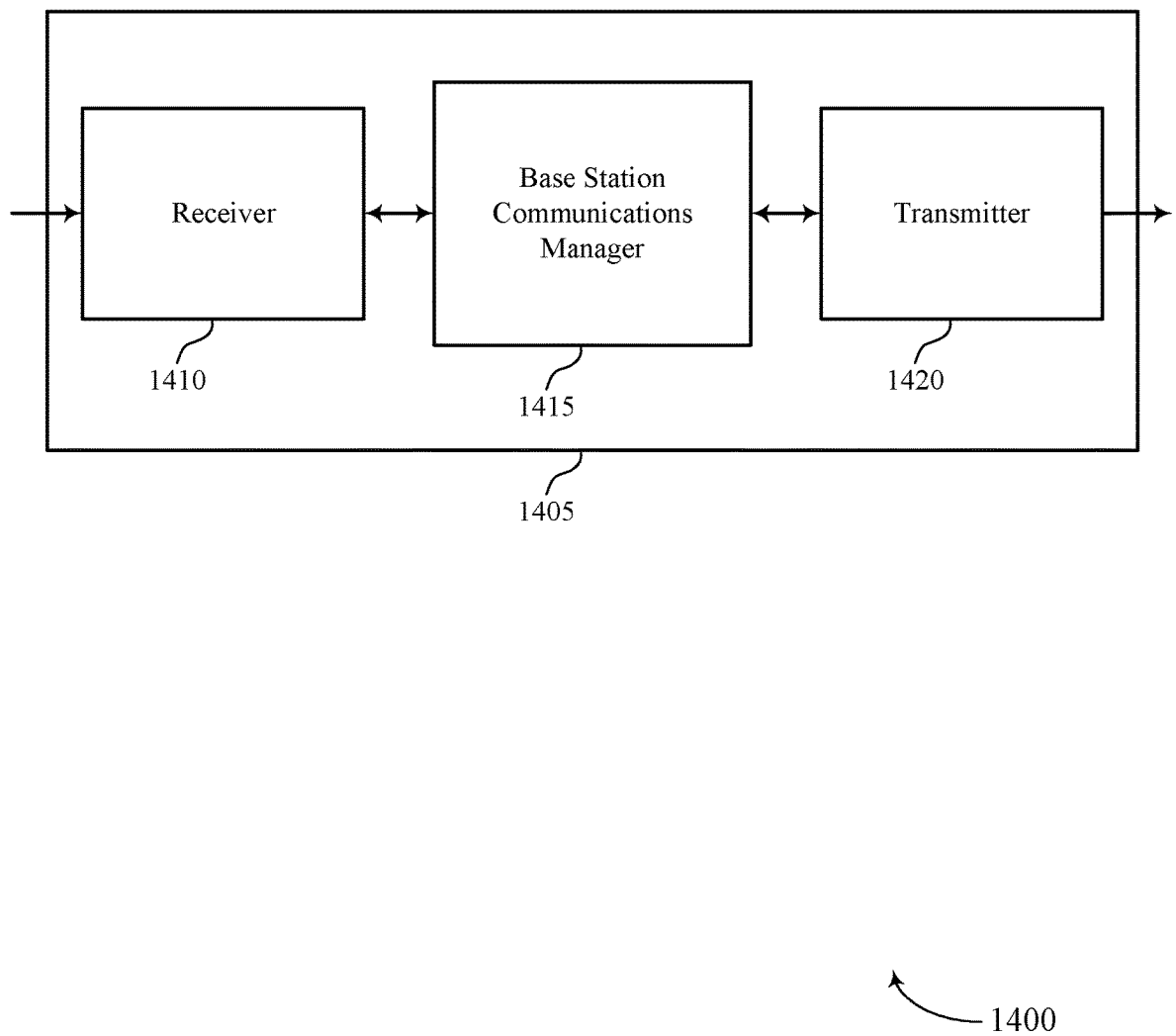
FIGS. 14 through 16 show block diagrams of a device that supports a per frequency indication of deployment schemes in accordance with aspects of the present disclosure.

FIG. 14 shows a block diagram 1400 of a wireless device 1405 that supports a per frequency indication of deployment schemes in accordance with aspects of the present disclosure. Wireless device 1405 may be an example of aspects of a base station 105 as described herein. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to per frequency indication of deployment schemes, etc.). Information may be passed on to other components of the device. The receiver 1410 may be an example of aspects of the transceiver 1735 described with reference to FIG. 17. The receiver 1410 may utilize a single antenna or a set of antennas.

Base station communications manager 1415 may be an example of aspects of the base station communications manager 1715 described with reference to FIG. 17. Base station communications manager 1415 and/or at least some of its various sub-components may be implemented in hardware, software executed by a processor, firmware, or any combination thereof. If implemented in software executed by a processor, the functions of the base station communications manager 1415 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1415 and/or at least some of its various sub-components may be physically located at various positions, including being distributed such that portions of functions are implemented at different physical locations by one or more physical devices. In some examples, base station communications manager 1415 and/or at least some of its various sub-components may be a separate and distinct component in accordance with various aspects of the present disclosure. In other examples, base station communications manager 1415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1415 may receive, at a first cell provided by the base station 105, a message including cell information for the first cell, the cell information including an indication of a network connectivity configuration in use by a second cell to access to a core network, and determine that a UE 115 in communication with the first cell supports the indicated network connectivity configuration in use by the second cell. Base station communications manager 1415 may transmit, to the UE 115, system information including an information element indicating one or more radio frequencies or RF spectrum bands available for use at the second cell and one or more network connectivity configurations, each of the one or more radio frequencies or RF spectrum bands associated with at least one of the one or more network connectivity configurations of the second cell.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may utilize a single antenna or a set of antennas.

Figure 15:
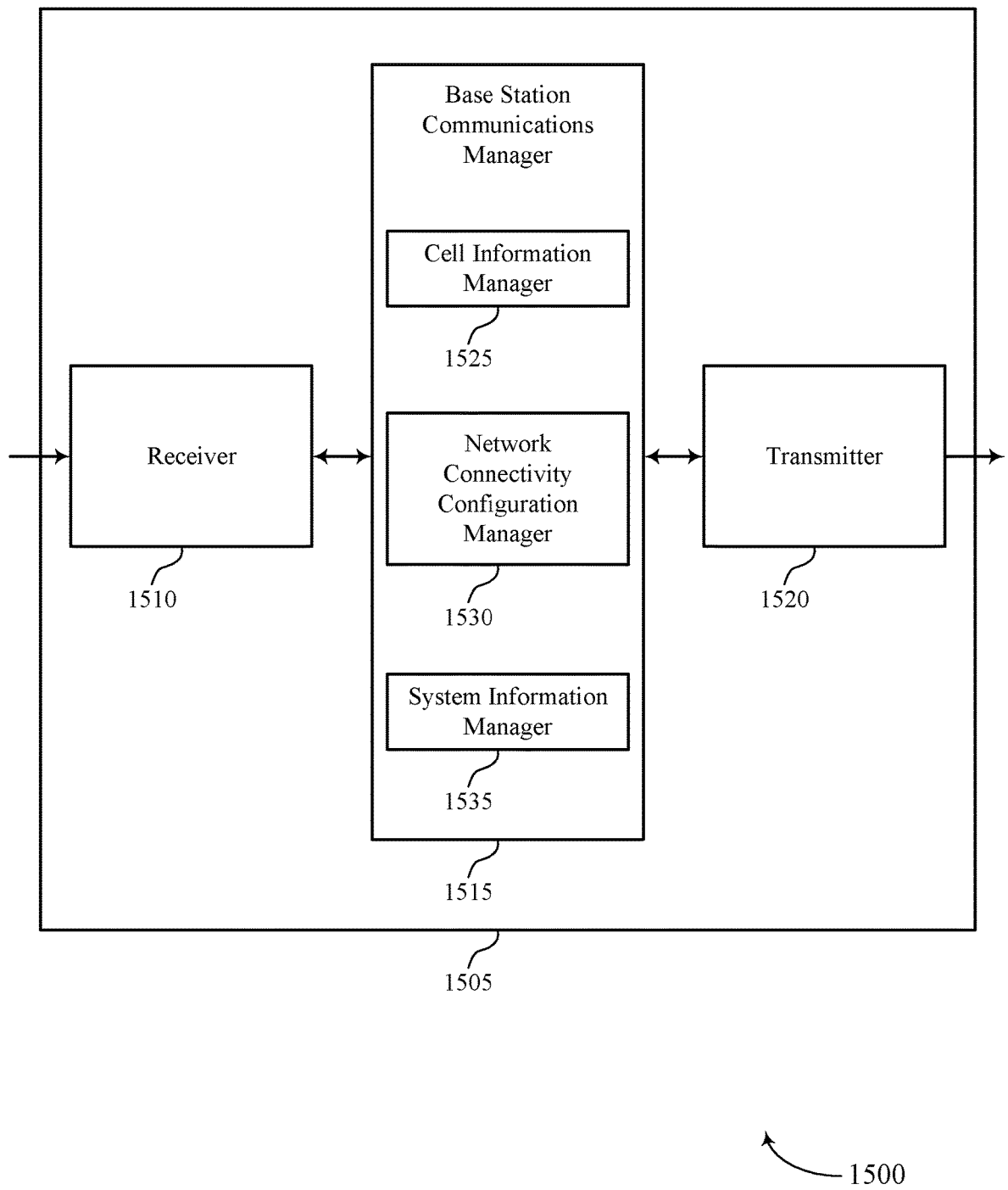

FIG. 15 shows a block diagram 1500 of a wireless device 1505 that supports a per frequency indication of deployment schemes in accordance with aspects of the present disclosure. Wireless device 1505 may be an example of aspects of a wireless device 1405 or a base station 105 as described with reference to FIG. 14. Wireless device 1505 may include receiver 1510, base station communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to per frequency indication of deployment schemes, etc.). Information may be passed on to other components of the device. The receiver 1510 may be an example of aspects of the transceiver 1735 described with reference to FIG. 17. The receiver 1510 may utilize a single antenna or a set of antennas.

Base station communications manager 1515 may be an example of aspects of the base station communications manager 1715 described with reference to FIG. 17. Base station communications manager 1515 may also include cell information manager 1525, network connectivity configuration manager 1530, and system information manager 1535.

Cell information manager 1525 may receive, at a first cell provided by the base station 105, a message including cell information for the first cell, the cell information including an indication of a network connectivity configuration in use by a second cell to access to a core network. In some cases, cell information manager 1525 may receive the message from a network node, or from the second cell, or a combination thereof, and determine a service provided by the second cell.

Network connectivity configuration manager 1530 may determine that a UE 115 in communication with the first cell supports the indicated network connectivity configuration in use by the second cell, select the network connectivity configuration or the second network connectivity configuration for the UE 115 to use, where the selecting is based on the indicated capability. In some cases, network connectivity configuration manager 1530 may receive, from the UE 115, an indication of a capability of the UE 115 to support the network connectivity configuration, where the determining is based on the received indication of the capability. In some cases, the network connectivity configuration includes a standalone deployment of the second cell, or an assisted access deployment of the first cell and the second cell.

System information manager 1535 may transmit, to the UE 115, system information including an information element indicating one or more radio frequencies or RF spectrum bands available for use at the second cell and one or more network connectivity configurations. Each of the one or more radio frequencies or RF spectrum bands may be associated with at least one of the one or more network connectivity configurations of the second cell. In some cases, system information manager 1535 may transmit, as part of the system information, a second information element for an RF spectrum band in use by a second cell, where the second information element indicates a second network connectivity configuration for access to the core network via the second cell, the second network connectivity configuration being different from a first network connectivity configuration supported by the UE 115. In some examples, system information manager 1535 may indicate, in the system information, the determined service provided by the second cell. In some cases, the system information includes a SIB including a list of at least one cell, where the at least one cell includes the second cell.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may utilize a single antenna or a set of antennas.

Figure 16:
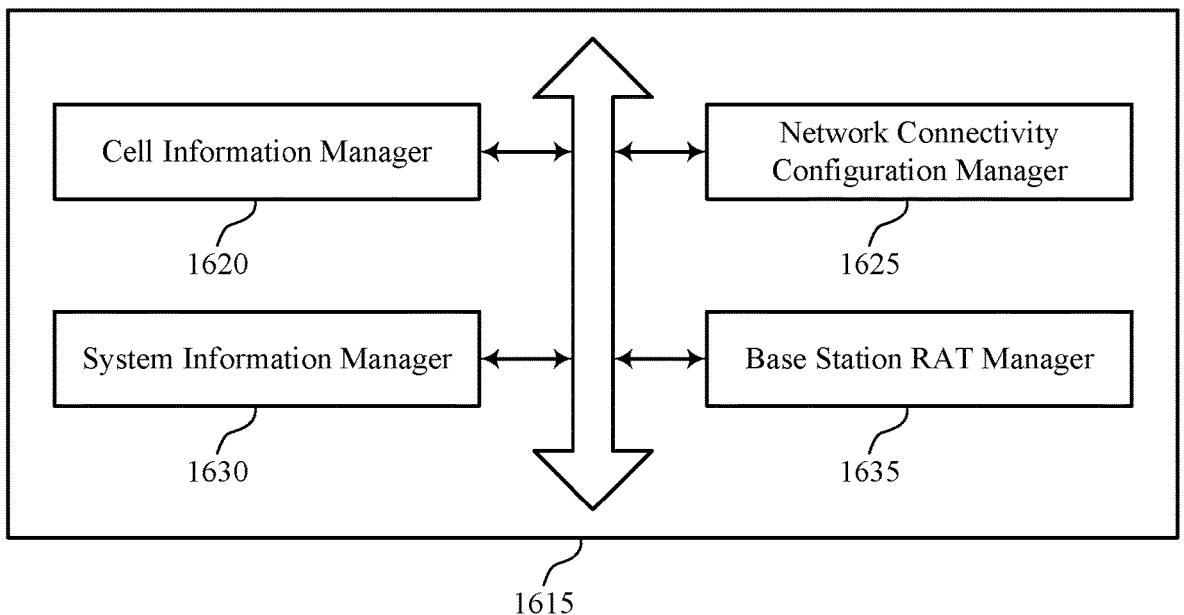

FIG. 16 shows a block diagram 1600 of a base station communications manager 1615 that supports a per frequency indication of deployment schemes in accordance with aspects of the present disclosure. The base station communications manager 1615 may be an example of aspects of a base station communications manager 1715 described with reference to FIGS. 14, 15, and 17. The base station communications manager 1615 may include cell information manager 1620, network connectivity configuration manager 1625, system information manager 1630, and base station RAT manager 1635. Each of these modules may communicate, directly or indirectly, with one another (e.g., via one or more buses).

Cell information manager 1620 may receive, at a first cell provided by the base station 105, a message including cell information for the first cell, the cell information including an indication of a network connectivity configuration in use by a second cell to access to a core network, receive the message from a network node, or from the second cell, or a combination thereof, and determine a service provided by the second cell.

Network connectivity configuration manager 1625 may determine that a UE 115 in communication with the first cell supports the indicated network connectivity configuration in use by the second cell, select the network connectivity configuration or the second network connectivity configuration for the UE 115 to use, where the selecting is based on the indicated capability. In some cases, network connectivity configuration manager 1625 may receive, from the UE 115, an indication of a capability of the UE 115 to support the network connectivity configuration, where the determining is based on the received indication of the capability. In some cases, the network connectivity configuration includes a standalone deployment of the second cell, or an assisted access deployment of the first cell and the second cell.

System information manager 1630 may transmit, to the UE 115, system information including an information element indicating one or more radio frequencies or RF spectrum bands available for use at the second cell and one or more network connectivity configurations, each of the one or more radio frequencies or RF spectrum bands associated with at least one of the one or more network connectivity configurations of the second cell. In some cases, system information manager 1630 may transmit, as part of the system information, a second information element for an RF spectrum band in use by a second cell, where the second information element indicates a second network connectivity configuration for access to the core network via the second cell, the second network connectivity configuration being different from a first network connectivity configuration. In some examples, system information manager 1630 may indicate, in the system information, the determined service provided by the second cell. In some cases, the system information includes a SIB including a cell list. For example, the cell list may include a list of one or more cells that includes the second cell.

Base station RAT manager 1635 may manage RATs for the base station 105. In some cases, the core network includes a first core network that operates using a first RAT or a second core network that operates using a second RAT that is different from the first RAT. In some cases, the first RAT includes an E-UTRA RAT and the second RAT includes an NR RAT.

Figure 17:
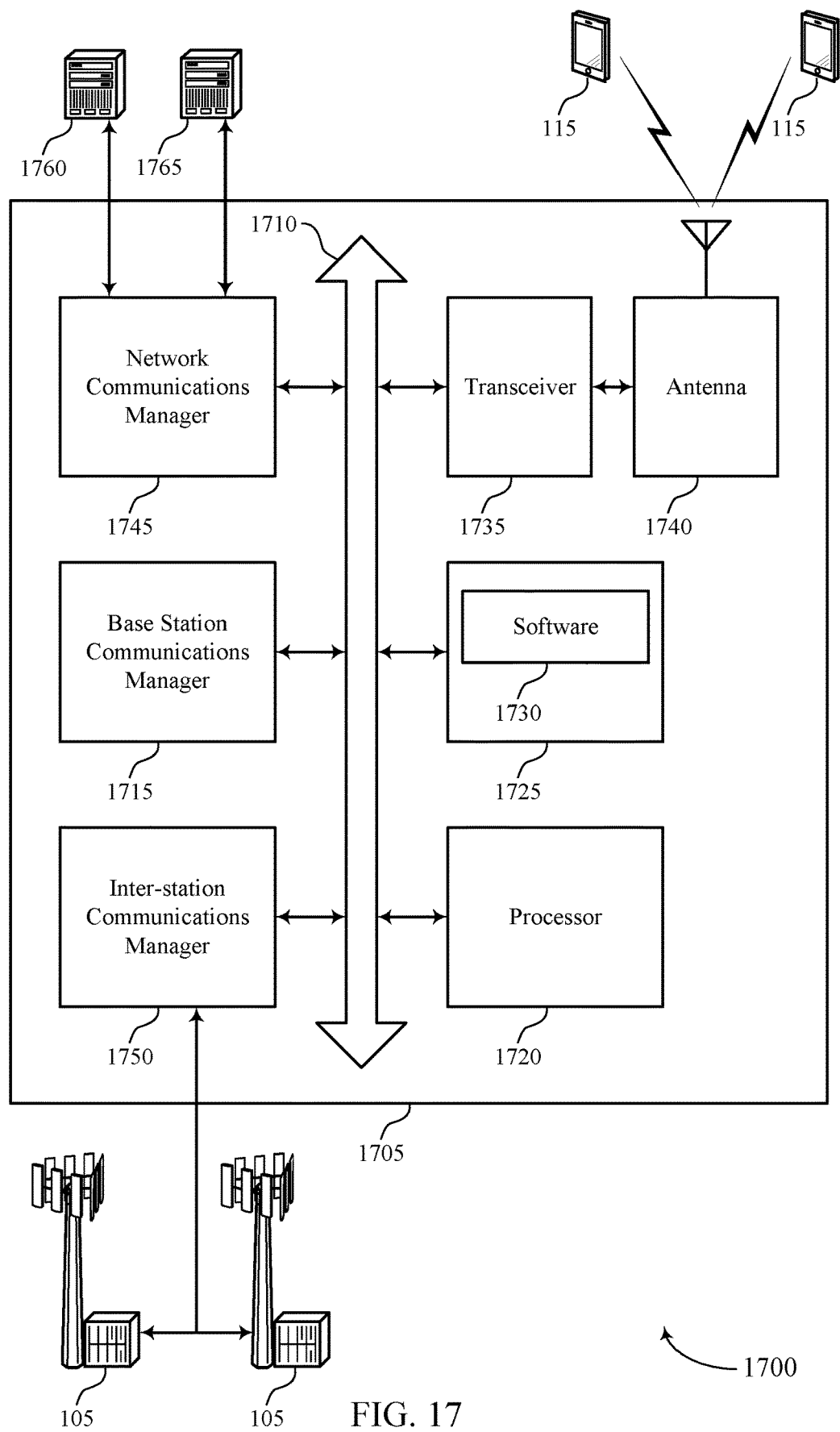
FIG. 17 illustrates a block diagram of a system including a base station that supports a per frequency indication of deployment schemes in accordance with aspects of the present disclosure.

FIG. 17 shows a diagram of a system 1700 including a device 1705 that supports a per frequency indication of deployment schemes in accordance with aspects of the present disclosure. Device 1705 may be an example of or include the components of base station 105 as described above, e.g., with reference to FIG. 1. Device 1705 may include components for bi-directional voice and data communications including components for transmitting and receiving communications, including base station communications manager 1715, processor 1720, memory 1725, software 1730, transceiver 1735, antenna 1740, network communications manager 1745, and inter-station communications manager 1750. These components may be in electronic communication via one or more buses (e.g., bus 1710). Device 1705 may communicate wirelessly with one or more UEs 115.

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting per frequency indication of deployment schemes).

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware or software operation such as the interaction with peripheral components or devices.

Software 1730 may include code to implement aspects of the present disclosure, including code to support per frequency indication of deployment schemes. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas. In some cases, the wireless device may include a single antenna 1740. However, in some cases the device may have more than one antenna 1740, which may be capable of concurrently transmitting or receiving multiple wireless transmissions.

Network communications manager 1745 may manage communications with the core network (e.g., via one or more wired backhaul links). Network communications manager 1745 may communicate with core network nodes, e.g., core network node 1760, core network node 1765, or both, of one or more different core networks, for example according to deployment options or network connectivity configurations as described with reference to FIGS. 2 through 9. In some examples, core network node 1760 may be an example of an EPC 215 as described with reference to FIG. 2. In some examples, core network node 1765 may be an example of a 5GC 230 as described with reference to FIG. 2. For example, the network communications manager 1745 may manage the transfer of data communications for client devices, such as one or more UEs 115.

Inter-station communications manager 1750 may manage communications with other base station 105, and may include a controller or scheduler for controlling communications with UEs 115 in cooperation with other base stations 105. For example, the inter-station communications manager 1750 may coordinate scheduling for transmissions to UEs 115 for various interference mitigation techniques such as beamforming or joint transmission. In some examples, inter-station communications manager 1750 may provide an X2 interface within an Long Term Evolution (LTE)/LTE-A wireless communication network technology to provide communication between base stations 105.

Figure 18:
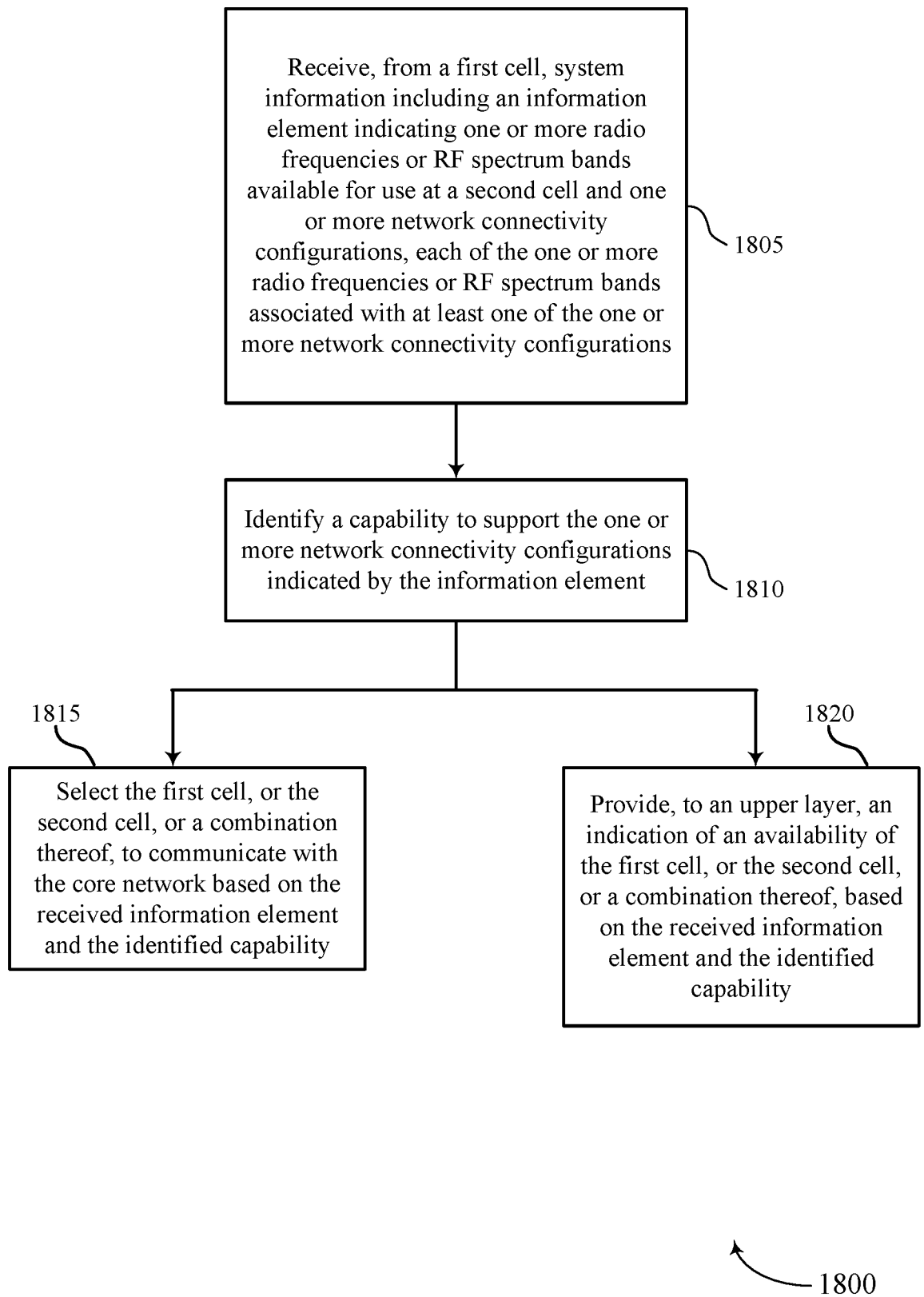
FIGS. 18 through 22 illustrate methods for per frequency indication of deployment schemes in accordance with aspects of the present disclosure.

FIG. 18 shows a flowchart illustrating a method 1800 for per frequency indication of deployment schemes in accordance with aspects of the present disclosure. The operations of method 1800 may be implemented by a UE 115 or its components as described herein. For example, the operations of method 1800 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may receive, from a first cell, system information comprising an information element indicating one or more radio frequencies or RF spectrum bands available for use at a second cell and one or more network connectivity configurations, each of the one or more radio frequencies or RF spectrum bands associated with at least one of the one or more network connectivity configurations. The operations of 1805 may be performed according to the methods described herein. In certain examples, aspects of the operations of 1805 may be performed by a system information manager as described with reference to FIGS. 10 through 13.

At 1810 the UE 115 may identify a capability of the UE 115 to support the one or more network connectivity configurations indicated by the information element. The operations of 1810 may be performed according to the methods described herein. In certain examples, aspects of the operations of 1810 may be performed by a capability identifying component as described with reference to FIGS. 10 through 13.

At 1815 the UE 115 may optionally select the first cell, or the second cell, or a combination thereof, to communicate with the core network based at least in part on the received information element and the identified capability. The operations of 1815 may be performed according to the methods described herein. In certain examples, aspects of the operations of 1815 may be performed by a cell selection manager as described with reference to FIGS. 10 through 13.

Alternatively, at 1820 the UE 115 may provide, to an upper layer of the UE 115, an indication of an availability of the first cell, or the second cell, or a combination thereof, based at least in part on the received information element and the identified capability. The operations of 1820 may be performed according to the methods described herein. In certain examples, aspects of the operations of 1820 may be performed by a cell selection manager as described with reference to FIGS. 10 through 13.

Figure 19:
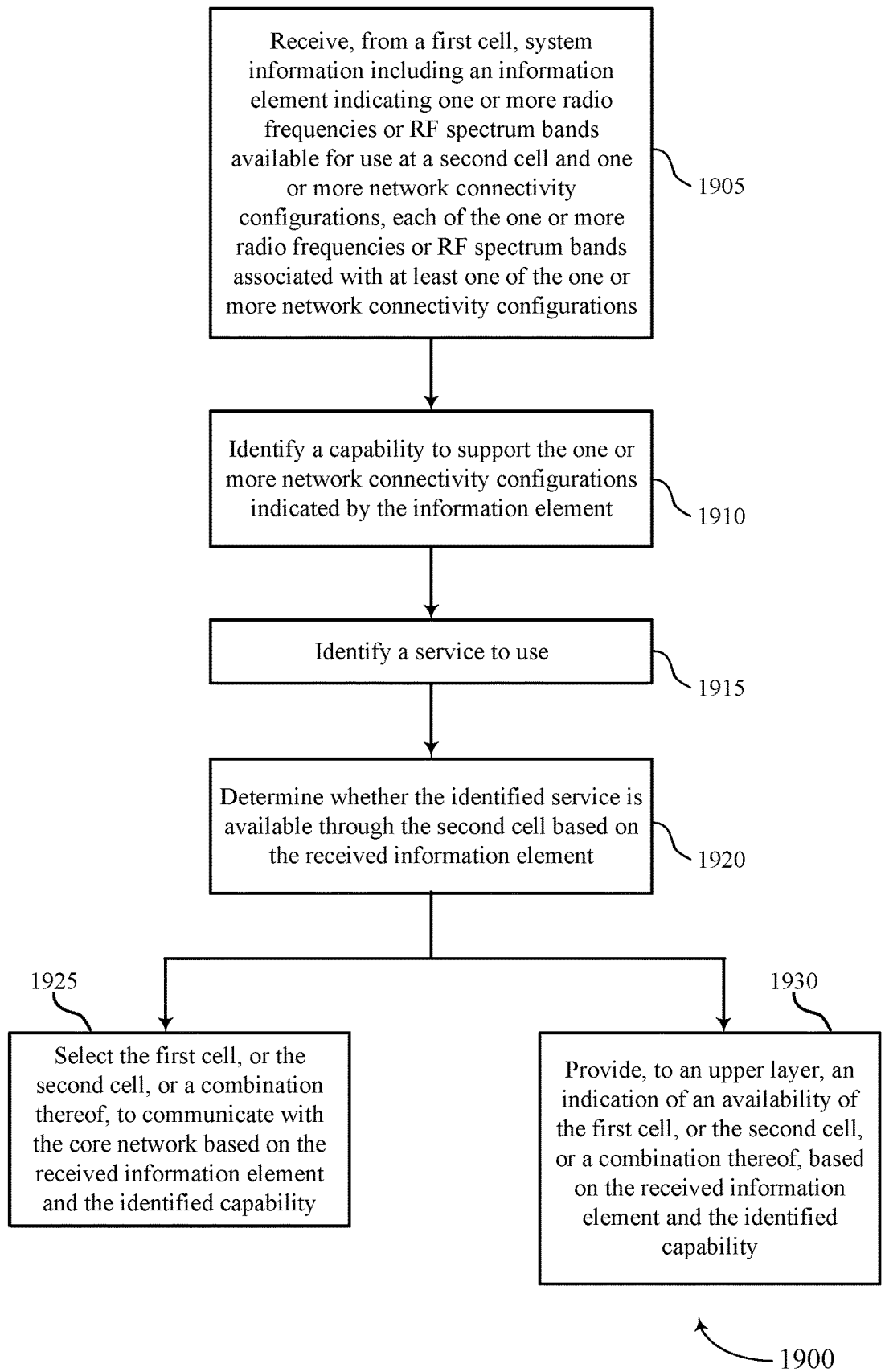

FIG. 19 shows a flowchart illustrating a method 1900 for per frequency indication of deployment schemes in accordance with aspects of the present disclosure. The operations of method 1900 may be implemented by a UE 115 or its components as described herein. For example, the operations of method 1900 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 1905 the UE 115 may receive, from a first cell, system information comprising an information element indicating one or more radio frequencies or RF spectrum bands available for use at a second cell and one or more network connectivity configurations, each of the one or more radio frequencies or RF spectrum bands associated with at least one of the one or more network connectivity configurations. The operations of 1905 may be performed according to the methods described herein. In certain examples, aspects of the operations of 1905 may be performed by a system information manager as described with reference to FIGS. 10 through 13.

At 1910 the UE 115 may identify a capability of the UE 115 to support the one or more network connectivity configurations indicated by the information element. The operations of 1910 may be performed according to the methods described herein. In certain examples, aspects of the operations of 1910 may be performed by a capability identifying component as described with reference to FIGS. 10 through 13.

At 1915 the UE 115 may identify a service to use. The operations of 1915 may be performed according to the methods described herein. In certain examples, aspects of the operations of 1915 may be performed by a service identifying component as described with reference to FIGS. 10 through 13.

At 1920 the UE 115 may determine whether the identified service is available through the second cell based at least in part on the received information element. The operations of 1920 may be performed according to the methods described herein. In certain examples, aspects of the operations of 1920 may be performed by a service identifying component as described with reference to FIGS. 10 through 13.

In some cases, at 1925 the UE 115 may select the first cell to communicate with the core network based at least in part on the received information element and the identified capability, wherein the first cell is selected based at least in part on the identification of the capability of the UE 115 to support the one or more network connectivity configurations indicated by the information element. The operations of 1925 may be performed according to the methods described herein. In certain examples, aspects of the operations of 1925 may be performed by a cell selection manager as described with reference to FIGS. 10 through 13.

Alternatively, at 1930 the UE 115 may provide, to an upper layer of the UE 115, an indication of an availability of the first cell, or the second cell, or a combination thereof, based at least in part on the received information element and the identified capability. The operations of 1930 may be performed according to the methods described herein. In certain examples, aspects of the operations of 1930 may be performed by a cell selection manager as described with reference to FIGS. 10 through 13.

Figure 20:
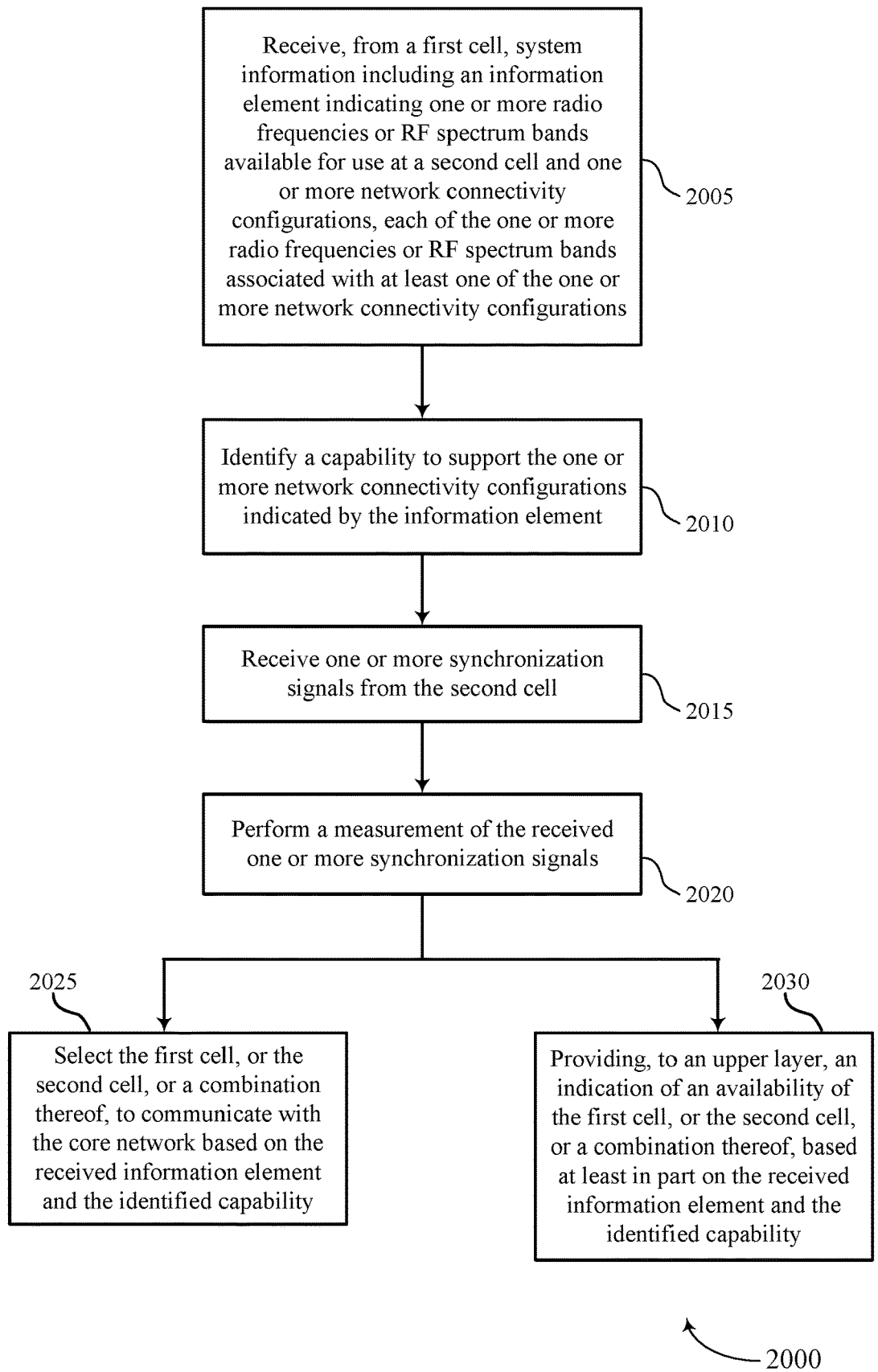

FIG. 20 shows a flowchart illustrating a method 2000 for per frequency indication of deployment schemes in accordance with aspects of the present disclosure. The operations of method 2000 may be implemented by a UE 115 or its components as described herein. For example, the operations of method 2000 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 2005 the UE 115 may receive, from a first cell, system information comprising an information element indicating one or more radio frequencies or RF spectrum bands available for use at a second cell and one or more network connectivity configurations, each of the one or more radio frequencies or RF spectrum bands associated with at least one of the one or more network connectivity configurations. The operations of 2005 may be performed according to the methods described herein. In certain examples, aspects of the operations of 2005 may be performed by a system information manager as described with reference to FIGS. 10 through 13.

At 2010 the UE 115 may identify a capability of the UE 115 to support the one or more network connectivity configurations indicated by the information element. The operations of 2010 may be performed according to the methods described herein. In certain examples, aspects of the operations of 2010 may be performed by a capability identifying component as described with reference to FIGS. 10 through 13.

At 2015 the UE 115 may receive one or more synchronization signals from the second cell. The operations of 2015 may be performed according to the methods described herein. In certain examples, aspects of the operations of 2015 may be performed by a synchronization signal manager as described with reference to FIGS. 10 through 13.

At 2020 the UE 115 may perform a measurement of the received one or more synchronization signals. The operations of 2020 may be performed according to the methods described herein. In certain examples, aspects of the operations of 2020 may be performed by a synchronization signal manager as described with reference to FIGS. 10 through 13.

At 2025 the UE 115 may optionally select the first cell to communicate with the core network based at least in part on the received information element and the identified capability, wherein selecting the first cell is based at least in part on the measurement. The operations of 2025 may be performed according to the methods described herein. In certain examples, aspects of the operations of 2025 may be performed by a cell selection manager as described with reference to FIGS. 10 through 13.

Alternatively, at 2030 the UE 115 may provide, to an upper layer of the UE 115, an indication of an availability of the first cell, or the second cell, or a combination thereof, based at least in part on the received information element and the identified capability. The operations of 2030 may be performed according to the methods described herein. In certain examples, aspects of the operations of 2030 may be performed by a cell selection manager as described with reference to FIGS. 10 through 13.

Figure 21:
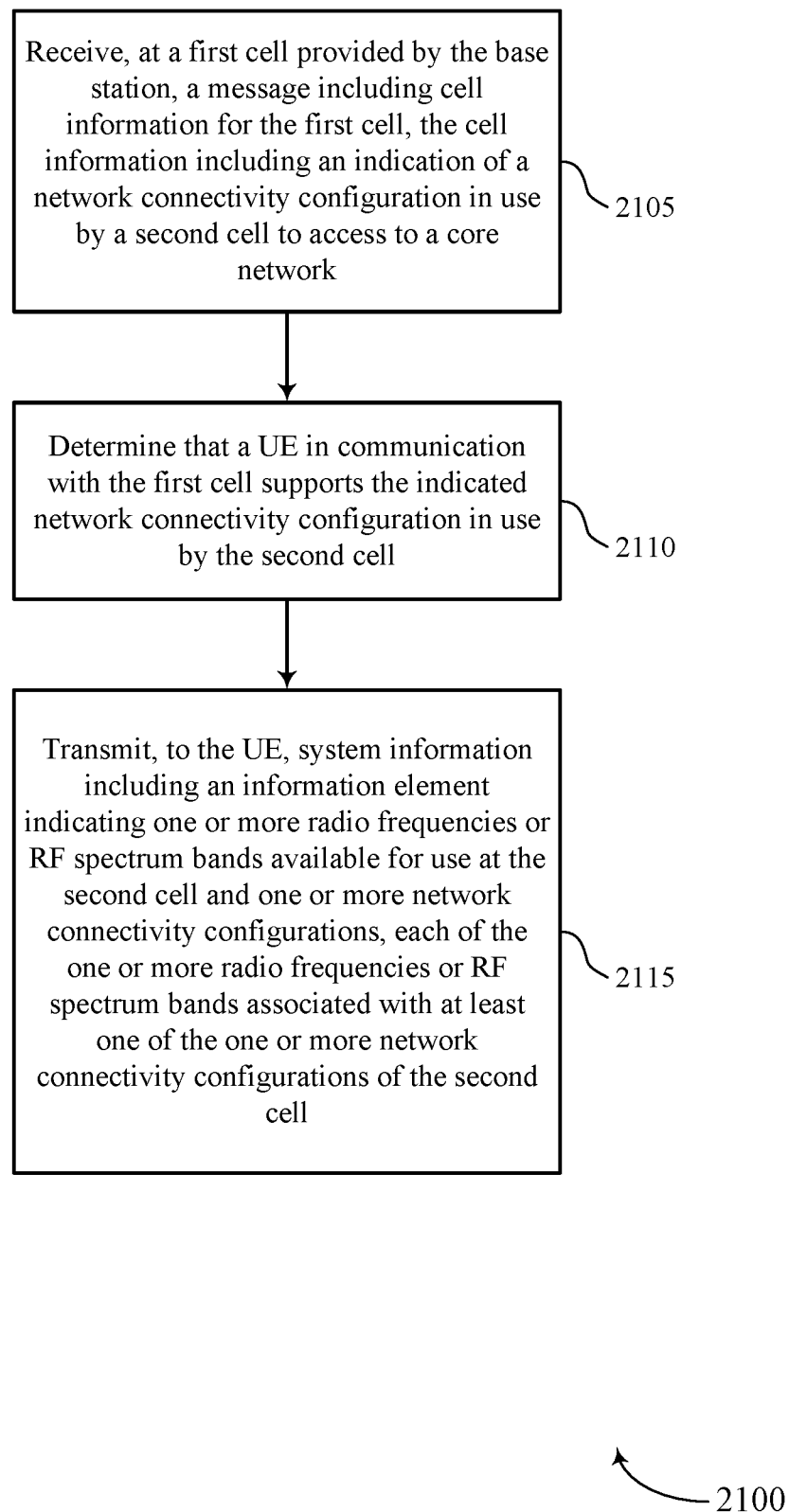

FIG. 21 shows a flowchart illustrating a method 2100 for per frequency indication of deployment schemes in accordance with aspects of the present disclosure. The operations of method 2100 may be implemented by a base station 105 or its components as described herein. For example, the operations of method 2100 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At 2105 the base station 105 may receive, at a first cell provided by the base station 105, a message comprising cell information for the first cell, the cell information including an indication of a network connectivity configuration in use by a second cell to access to a core network. The operations of 2105 may be performed according to the methods described herein. In certain examples, aspects of the operations of 2105 may be performed by a cell information manager as described with reference to FIGS. 14 through 17.

At 2110 the base station 105 may determine that a UE 115 in communication with the first cell supports the indicated network connectivity configuration in use by the second cell. The operations of 2110 may be performed according to the methods described herein. In certain examples, aspects of the operations of 2110 may be performed by a network connectivity configuration manager as described with reference to FIGS. 14 through 17.

At 2115 the base station 105 may transmit, to the UE 115, system information comprising an information element indicating one or more radio frequencies or RF spectrum bands available for use at the second cell and one or more network connectivity configurations, each of the one or more radio frequencies or RF spectrum bands associated with at least one of the one or more network connectivity configurations of the second cell. The operations of 2115 may be performed according to the methods described herein. In certain examples, aspects of the operations of 2115 may be performed by a system information manager as described with reference to FIGS. 14 through 17.

Figure 22:
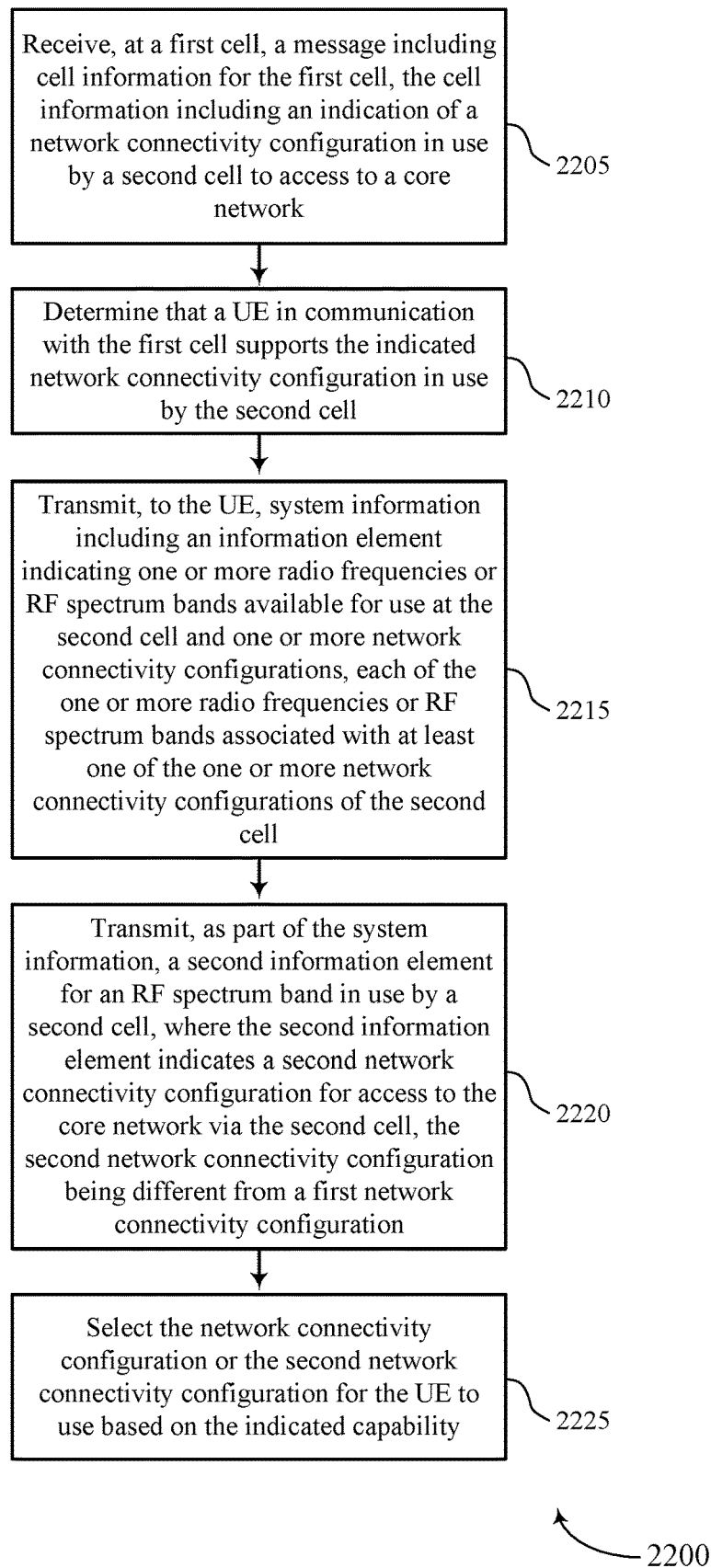

FIG. 22 shows a flowchart illustrating a method 2200 for per frequency indication of deployment schemes in accordance with aspects of the present disclosure. The operations of method 2200 may be implemented by a base station 105 or its components as described herein. For example, the operations of method 2200 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At 2205 the base station 105 may receive, at a first cell provided by the base station 105, a message comprising cell information for the first cell, the cell information including an indication of a network connectivity configuration in use by a second cell to access to a core network. The operations of 2205 may be performed according to the methods described herein. In certain examples, aspects of the operations of 2205 may be performed by a cell information manager as described with reference to FIGS. 14 through 17.

At 2210 the base station 105 may determine that a UE 115 in communication with the first cell supports the indicated network connectivity configuration in use by the second cell. The operations of 2210 may be performed according to the methods described herein. In certain examples, aspects of the operations of 2210 may be performed by a network connectivity configuration manager as described with reference to FIGS. 14 through 17.

At 2215 the base station 105 may transmit, to the UE 115, system information comprising an information element indicating one or more radio frequencies or RF spectrum bands available for use at the second cell and one or more network connectivity configurations, each of the one or more radio frequencies or RF spectrum bands associated with at least one of the one or more network connectivity configurations of the second cell. The operations of 2215 may be performed according to the methods described herein. In certain examples, aspects of the operations of 2215 may be performed by a system information manager as described with reference to FIGS. 14 through 17.

At 2220 the base station 105 may transmit, as part of the system information, a second information element for an RF spectrum band in use by a second cell, wherein the second information element indicates a second network connectivity configuration for access to the core network via the second cell, the second network connectivity configuration being different from a first network connectivity configuration. The operations of 2220 may be performed according to the methods described herein. In certain examples, aspects of the operations of 2220 may be performed by a system information manager as described with reference to FIGS. 14 through 17.

At 2225 the base station 105 may select the network connectivity configuration or the second network connectivity configuration for the UE 115 to use, wherein the selecting is based at least in part on the indicated capability. The operations of 2225 may be performed according to the methods described herein. In certain examples, aspects of the operations of 2225 may be performed by a network connectivity configuration manager as described with reference to FIGS. 14 through 17.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC- FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a first cell associated with a first radio access technology, system information comprising an information element indicating one or more radio frequencies or radio frequency (RF) spectrum bands available for use at a second cell and one or more network connectivity configurations, each of the one or more radio frequencies or RF spectrum bands associated with at least one of the one or more network connectivity configurations, wherein at least one network connectivity configuration of the one or more network connectivity configurations indicates a dual-connectivity configuration for a connection between the UE and a core network using the first radio access technology and a second radio access technology that is different from the first radio access technology;
    identifying a capability of the UE to support the dual-connectivity configuration indicated by the information element; and
    selecting the first cell and the second cell to communicate with the core network based at least in part on the received information element and the identified capability.

2. The method of claim 1, further comprising:
    identifying a service to use at the UE; and
    determining whether the identified service is available through the second cell based at least in part on the received information element, wherein the first cell is selected based at least in part on the identification of the capability of the UE to support the one or more network connectivity configurations indicated by the information element.

3. The method of claim 2, further comprising:
    determining that the identified service is available through the second cell, wherein selecting the first cell and the second cell comprises camping on the first cell and the second cell based at least in part on the availability of the service.

4. The method of claim 2, further comprising:
    determining that the identified service is unavailable through the second cell, wherein selecting the first cell and the second cell comprises camping on the first cell and the second cell based at least in part on the unavailability of the identified service.

5. The method of claim 1, further comprising:
    receiving one or more synchronization signals from the second cell; and
    performing a measurement of the received one or more synchronization signals, wherein selecting the first cell is based at least in part on the measurement.

6. The method of claim 5, further comprising:
    determining that the measurement of the received one or more synchronization signals satisfies predetermined one or more criteria, wherein selecting the first cell comprises camping on the first cell, or the second cell, or a combination thereof.

7. The method of claim 5, further comprising:
    determining that the measurement of the received one or more synchronization signals fails to satisfy predetermined one or more criteria, wherein the selecting comprises camping on the first cell.

8. The method of claim 5, wherein the one or more synchronization signals comprises a primary synchronization signal (PSS), or a secondary synchronization signal (SSS), or a combination thereof.

9. The method of claim 1, wherein the selecting comprises:
    reselecting the first cell or the second cell based at least in part on the received information element and the identified capability.

10. The method of claim 1, further comprising:
    receiving, as part of the system information, a second information element that is associated with the one or more radio frequencies or the RF spectrum bands in use by a third cell, wherein the second information element indicates a second network connectivity configuration for access to the core network via the third cell, the second network connectivity configuration being different from a first network connectivity configuration supported by the UE; and
    selecting the third cell based at least in part on the identified capability.

11. The method of claim 1, further comprising:
    transmitting an indication of the identified capability to the first cell.

12. The method of claim 1, wherein the system information comprises a system information block (SIB) that includes a list of one or more radio frequencies, or one or more RF spectrum bands available at a plurality of neighboring cells.

13. The method of claim 1, wherein the one or more network connectivity configurations comprise a standalone deployment of the second cell, or a dual connectivity deployment of the first cell and the second cell, or a combination thereof.

14. The method of claim 1, wherein the one or more network connectivity configurations comprise the core network that operates using a different radio access technology than the first radio access technology of the first cell, or the second cell, or both the first cell and the second cell.

15. The method of claim 14, wherein the first radio access technology comprises an evolved universal terrestrial radio access (E-UTRA) radio access technology, or a new radio (NR) radio access technology, or a next generation (NG) E-UTRA radio access technology, or a combination thereof, and wherein the different radio access technology comprises an NR radio access technology, or an E-UTRA radio access technology, or an NG E-UTRA radio access technology, or a combination thereof.

16. A method for wireless communication at a base station, comprising:
  receiving, at a first cell associated with a first radio access technology provided by the base station, a message comprising cell information for the first cell, the cell information including an indication of a network connectivity configuration in use by a second cell to access to a core network;
  determining that a user equipment (UE) in communication with the first cell supports the indicated network connectivity configuration in use by the second cell; and
  transmitting, to the UE, system information comprising an information element indicating one or more radio frequencies or radio frequency (RF) spectrum bands available for use at the second cell and one or more network connectivity configurations, each of the one or more radio frequencies or RF spectrum bands associated with at least one of the one or more network connectivity configurations of the second cell, wherein at least one network connectivity configuration of the one or more network connectivity configurations indicates a dual-connectivity configuration for a connection between the UE and the core network using the first radio access technology and a second radio access technology that is different from the first radio access technology.

17. The method of claim 16, further comprising:
transmitting, as part of the system information, a second information element for an RF spectrum band in use by the second cell, wherein the second information element indicates a second network connectivity configuration for access to the core network via the second cell, the second network connectivity configuration being different from the network connectivity configuration.

18. The method of claim 17, further comprising:
selecting the network connectivity configuration or the second network connectivity configuration for the UE to use, wherein the selecting is based at least in part on the indicated capability.

19. The method of claim 16, further comprising:
receiving the message from a network node, or from the second cell, or a combination thereof.

20. The method of claim 16, further comprising:
determining a service provided by the second cell; and indicating, in the system information, the determined service provided by the second cell.

21. The method of claim 16, further comprising:
receiving, from the UE, an indication of a capability of the UE to support the network connectivity configuration, wherein the determining is based on the received indication of the capability.

22. The method of claim 16, wherein the network connectivity configuration comprises a standalone deployment of the second cell, or an assisted access deployment of the first cell and the second cell; and
  the core network comprises a first core network that operates using the first radio access technology or a second core network that operates using the second radio access technology that is different from the first radio access technology.

23. The method of claim 22, wherein the first radio access technology comprises an evolved universal terrestrial radio access (E-UTRA) RAT, or a new radio (NR) radio access technology, or a next generation (NG) E-UTRA radio access technology, or a combination thereof, and wherein the second radio access technology comprises an NR radio access technology, or an E-UTRA radio access technology, or an NG E-UTRA radio access technology, or a combination thereof.

24. The method of claim 16, wherein the system information comprises a system information block (SIB) including a list of at least one cell, the at least one cell comprising the second cell.

25. An apparatus for wireless communication at a user equipment (UE), comprising:
  a processor;
  memory in electronic communication with the processor; and
  instructions stored in the memory and operable, when executed by the processor, to cause the apparatus to:
    receive, from a first cell associated with a first radio access technology, system information comprising an information element indicating one or more radio frequencies or radio frequency (RF) spectrum bands available for use at a second cell and one or more network connectivity configurations, each of the one or more radio frequencies or RF spectrum bands associated with at least one of the one or more network connectivity configurations, wherein at least one network connectivity configuration of the one or more network connectivity configurations indicates a dual-connectivity configuration for a connection between the UE and a core network using the first radio access technology and a second radio access technology that is different from the first radio access technology;
    identify a capability of the UE to support the dual-connectivity configuration indicated by the information element; and
    select the first cell second cell to communicate with the core network based at least in part on the received information element and the identified capability.

26. The apparatus of claim 25, wherein the instructions are further executable by the processor to cause the apparatus to:
  identify a service to use at the UE; and
  determine whether the identified service is available through the second cell based at least in part on the received information element, wherein the first cell is selected based at least in part on the identification of the capability of the UE to support the one or more network connectivity configurations indicated by the information element.

27. The apparatus of claim 26, wherein the instructions are further executable by the processor to cause the apparatus to:

determine that the identified service is available through the second cell, wherein selecting the first cell and the second cell comprises camping on the first cell and the second cell based at least in part on the availability of the service; or determine that the identified service is unavailable through the second cell, wherein selecting the first cell and the second cell comprises camping on the first cell and the second cell based at least in part on the unavailability of the identified service.

28. The apparatus of claim 25, wherein the instructions are further executable by the processor to cause the apparatus to:

receive one or more synchronization signals from the second cell; and perform a measurement of the received one or more synchronization signals, wherein selecting the first cell is based at least in part on the measurement.

29. An apparatus for wireless communication at a base station, comprising:

a processor;

memory in electronic communication with the processor; and instructions stored in the memory and operable, when executed by the processor, to cause the apparatus to:

receive, at a first cell associated with a first radio access technology provided by the base station, a message comprising cell information for the first cell, the cell information including an indication of a network connectivity configuration in use by a second cell to access to a core network;

determine that a user equipment (UE) in communication with the first cell supports the indicated network connectivity configuration in use by the second cell; and transmit, to the UE, system information comprising an information element indicating one or more radio frequencies or radio frequency (RF) spectrum bands available for use at the second cell and one or more network connectivity configurations, each of the one or more radio frequencies or RF spectrum bands associated with at least one of the one or more network connectivity configurations of the second cell, wherein at least one network connectivity configuration of the one or more network connectivity configurations indicates a dual-connectivity configuration for a connection between the UE and the core network using the first radio access technology and a second radio access technology that is different from the first radio access technology.

30. The apparatus of claim 29, wherein the instructions are further executable by the processor to cause the apparatus to:

transmit, as part of the system information, a second information element for an RF spectrum band in use by the second cell, wherein the second information element indicates a second network connectivity configuration for access to the core network via the second cell, the second network connectivity configuration being different from the network connectivity configuration.

* * * * *